US012491437B2

(12) United States Patent
Furukawa

(10) Patent No.: US 12,491,437 B2
(45) Date of Patent: Dec. 9, 2025

(54) COMPUTER-READABLE NON-TRANSITORY STORAGE MEDIUM, INFORMATION PROCESSING APPARATUS, INFORMATION PROCESSING SYSTEM, AND INFORMATION PROCESSING METHOD

(71) Applicant: Nintendo Co., Ltd., Kyoto (JP)

(72) Inventor: Taiyo Furukawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 287 days.

(21) Appl. No.: 18/337,991

(22) Filed: Jun. 20, 2023

(65) Prior Publication Data

US 2023/0405465 A1 Dec. 21, 2023

(30) Foreign Application Priority Data

Jun. 21, 2022 (JP) ................................ 2022-099868

(51) Int. Cl.
*A63F 13/54* (2014.01)
*A63F 13/52* (2014.01)
*A63F 13/56* (2014.01)

(52) U.S. Cl.
CPC .............. *A63F 13/54* (2014.09); *A63F 13/52* (2014.09); *A63F 13/56* (2014.09)

(58) Field of Classification Search
CPC ........... A63F 13/54; A63F 13/42; A63F 13/46
See application file for complete search history.

(56) References Cited

FOREIGN PATENT DOCUMENTS

JP 2014-033900 2/2014
JP 2019-141162 8/2019
JP 2020-044284 3/2020
JP 2021-074396 5/2021
JP 2021074396 A 5/2021

*Primary Examiner* — Werner G Garner
(74) *Attorney, Agent, or Firm* — Nixon & Vanderhye PC

(57) ABSTRACT

For an object group including at least one object, the number of sounds to be reproduced is determined in accordance with the total number of objects. In addition, a reproduction sound(s) whose number is equal to the number of sounds is selected through random selection such that, with a probability based on a ratio of the number of each type of the objects included in the object group, the reproduction sound associated with each type of the objects, and the selected reproduction sound(s) is reproduced.

20 Claims, 23 Drawing Sheets

FIG. 23

303

| FIRST CHARACTER ID (331) | CHARACTER TYPE (332) | CURRENT POSITION (333) | AFFILIATION (334) | ACTION STATE (335) | ACTION PARAMETER (336) |
|---|---|---|---|---|---|
| 0001 | RED | (x,y,z) | NOT BELONGING | WAITING | ··· |
| 0002 | BLUE | (x,y,z) | PC | TRANSPORTING | ··· |
| 0003 | WHITE | (x,y,z) | PC | MOVING | ··· |
| ⋮ | ⋮ | ⋮ | ⋮ | ⋮ | ⋮ |

FIG. 24

304

| VOICE ID (341) | SOUND CONTENT (342) |
|---|---|
| R001 | ··· |
| R002 | ··· |
| R003 | ··· |
| ⋮ | ⋮ |

305

351 352 353 354 355

| CHARACTER TYPE | FIRST VOICE | SECOND VOICE | THIRD VOICE | FOURTH VOICE |
|---|---|---|---|---|
| RED | R001 | R002 | R003 | R004 |
| BLUE | B001 | B002 | B003 | B004 |
| YELLOW | Y001 | Y002 | Y003 | Y004 |
| WHITE | W001 | W002 | W003 | W004 |

306

361 362

| TRANSPORT BODY ID | CURRENT POSITION |
|---|---|
| 0001 | (x,y,z) |
| 0002 | (x,y,z) |
| 0003 | (x,y,z) |
| ⋮ | ⋮ |

FIG. 28

309

| GROUP ID (391) | TRANSPORT BODY ID (392) | DESTINATION INFORMATION (393) | CURRENT POSITION INFORMATION (394) | TRANSPORT SPEED PARAMETER (395) | MID-REPRODUCTION FLAG (396) | VIRTUAL SPEAKER POSITION INFORMATION (397) |
|---|---|---|---|---|---|---|
| 0001 | 005 | (x,y,z) | (x,y,z) | ... | ON | (x,y,z) |
| 0002 | 123 | (x,y,z) | (x,y,z) | ... | OFF | (x,y,z) |
| 0003 | 070 | (x,y,z) | (x,y,z) | ... | ON | (x,y,z) |
| ⋮ | ⋮ | ⋮ | ⋮ | ⋮ | ⋮ | ⋮ |

FIG. 29

310

| GROUP ID (401) | CONSTITUENT MEMBER ID (402) |
|---|---|
| 001 | 112233 |
| | 113355 |
| | 223344 |
| | ⋮ |
| | 667788 |
| 002 | 111222 |
| | 444555 |
| | 666777 |
| | ⋮ |
| | 987111 |
| ⋮ | ⋮ |

FIG. 30

311

| GROUP ID (411) | REPRODUCTION VOICE ID (412) | REPRODUCTION SPEED INFORMATION (413) |
|---|---|---|
| 001 | 001 | 3 |
| | 020 | 3 |
| | 003 | 3 |
| | Null | Null |
| 002 | 012 | 3 |
| | 025 | 3 |
| | 008 | 3 |
| | 025 | 3 |
| ⋮ | ⋮ | ⋮ |

COMPUTER-READABLE NON-TRANSITORY STORAGE MEDIUM, INFORMATION PROCESSING APPARATUS, INFORMATION PROCESSING SYSTEM, AND INFORMATION PROCESSING METHOD

CROSS REFERENCE TO RELATED APPLICATION

This application claims priority to Japanese Patent Application No. 2022-099868 filed on Jun. 21, 2022, the entire contents of which are incorporated herein by reference.

FIELD

The present disclosure relates to control of reproduction of sound data for a group of objects in a game.

BACKGROUND AND SUMMARY

Conventionally, a sound reproduction program capable of reproducing noisy ambient sounds has been known. In the sound reproduction program, all or some of a plurality of dynamic objects that act in a virtual space are divided into a plurality of clusters, and a sound associated with each cluster is reproduced.

In the above technology, a sound corresponding to each cluster is determined as follows. First, for each cluster, the number of male characters and the number of female characters are checked. Next, from predetermined sound source data, sound source data prepared as male sounds is selected for the number of males. Furthermore, from the sound source data, sound source data prepared for female sounds is selected for the number of females. Then, the selected sound source data are reproduced at the position of a representative point of each cluster (center of gravity of the cluster).

However, when the sounds selected by the above method are reproduced, from a certain cluster, the sounds corresponding to the numbers of males and females in that cluster are always reproduced. That is, since the ratio between the numbers of male and female sounds in the sounds to be reproduced is always constant, an impression that mechanical sound reproduction is performed is given to the user. Therefore, there is room for improvement in terms of performing a more natural sound expression.

Therefore, an object of the present disclosure is to provide a computer-readable non-transitory storage medium, an information processing apparatus, an information processing system, and an information processing method that enable a sound expression that is more natural and that gives a less uncomfortable feeling, according to a situation of a game.

In order to attain the object described above, for example, the following configuration examples are exemplified.

(Configuration 1)

Configuration 1 is directed to a computer-readable non-transitory storage medium having stored therein an information processing program to be executed in a computer of an information processing apparatus, the information processing program causing the computer to:

perform a group management process of managing an object group including at least one object placed in a virtual space;

perform a sound acquisition process of acquiring at least one reproduction sound associated with each type of the object;

perform a constituent object acquisition process of acquiring information of a number of each type of the objects included in the object group;

perform a sound number determination process of determining a number of sounds to be reproduced, in accordance with a constituent object number that is a total number of the objects included in the object group;

perform a sound random selection process of selecting the reproduction sound(s) whose number is equal to the number of sounds, through random selection such that, with a probability based on a ratio of the number of each type of the objects included in the object group, the reproduction sound associated with each type of the objects is selected through random selection;

perform a reproduction process of reproducing the reproduction sound(s) selected through random selection in the sound random selection process; and continuously and repeatedly perform the constituent object acquisition process, the sound number determination process, the sound random selection process, and the reproduction process.

According to the above configuration, the number of sounds to be reproduced is determined in accordance with the total number of objects included in the object group, and a reproduction sound(s) is selected through random selection with a probability based on the ratio of each type of the objects. Accordingly, if the total number of objects included in the group increases, the number of sounds to be reproduced can be increased. In addition, the reproduction sound is selected through random selection on the basis of the ratio of each type of the objects. Therefore, in a short span of time, the types of sounds to be reproduced can have randomness. In addition, in a long span of time, the ratio of the types of sounds to be reproduced converges to the ratio of each type of the objects included in the object group. Accordingly, a user is allowed to recognize the number and the types of objects included in the group without having to visually look at the group.

(Configuration 2)

According to Configuration 2, in Configuration 1 described above, the information processing program may cause the computer to perform the sound number determination process of determining the number of sounds on the basis of a probability corresponding to the constituent object number.

According to the above configuration, the number of sounds to be reproduced at a predetermined timing can have randomness. Accordingly, it is possible to achieve a further natural sound expression.

(Configuration 3)

According to Configuration 3, in Configuration 1 or 2 described above, the information processing program may cause the computer to perform the sound number determination process of determining the number of sounds such that an increase in the number of sounds gradually decreases as the constituent object number increases.

According to the above configuration, when the number of objects included in the group is small, the user easily recognizes that the number of sounds has increased.

(Configuration 4)

According to Configuration 4, in any one of Configurations 1 to 3 described above, the information processing program may cause the computer to: perform the sound acquisition process of acquiring at least two reproduction sounds associated with each type of the object; and perform the sound random selection process such that one reproduction sound is selected from said at least two reproduction sounds associated with each type of the object.

According to the above configuration, a plurality of types of sounds are emitted from the same type of objects. Therefore, as compared to the case where only the same sound is reproduced from the same object, an impression of mechanical reproduction is prevented from being given, so that it is possible to achieve a more natural sound expression.

(Configuration 5)

According to Configuration 5, in any one of Configurations 1 to 4 described above, the information processing program may cause the computer to, when the same reproduction sound is selected through random selection a plurality of times in the sound random selection process, perform the reproduction process of reproducing the reproduction sound in an overlapping manner or at an increased volume.

According to the above configuration, when a plurality of identical sounds are simultaneously reproduced, the reproduction volume for the sounds can be increased. It is possible to achieve a natural sound expression that gives no uncomfortable feeling and in which, as a result of hearing the same sound in an overlapping manner, the sound is heard at a larger volume.

(Configuration 6)

According to Configuration 6, in any one of Configurations 1 to 5 described above, the information processing program may cause the computer to perform the reproduction process of performing reproduction such that a reproduction speed of the reproduction sound is higher as the constituent object number is larger.

According to the above configuration, since the reproduction speed changes according to the constituent object number of the group, the user can grasp the constituent object number of the group to some extent by merely hearing the reproduction sounds.

(Configuration 7)

According to Configuration 7, in any one of Configurations 1 to 6 described above, the information processing program may cause the computer to perform the reproduction process of reproducing the reproduction sound from a sound reproduction position(s) that is determined for each object group and whose number is smaller than the constituent object number of the object group and equal to or larger than 1.

According to the above configuration, the reproduction sounds can be reproduced without giving any uncomfortable feeling about a reproduction position while the processing load is reduced.

(Configuration 8)

According to Configuration 8, in any one of Configurations 1 to 7 described above, a plurality of the object groups may exist in the virtual space, and the information processing program may cause the computer to continuously and repeatedly perform the constituent object acquisition process, the sound number determination process, the sound random selection process, and the reproduction process for each of the plurality of the object groups.

According to the above configuration, it is possible to achieve a sound expression that is different for each group.

(Configuration 9)

According to Configuration 9, in any one of Configurations 1 to 8 described above, the information processing program may cause the computer to perform the reproduction process of reproducing the reproduction sound at a randomly determined volume.

According to the above configuration, since it is possible to express a state where the volume is different (the loudness of the sound is different) for each object, it is possible to achieve a more natural sound expression.

(Configuration 10)

According to Configuration 10, in any one of Configurations 1 to 9 described above, the information processing program may further cause the computer to place the object in the virtual space in accordance with an operation input by a user.

According to the above configuration, it is possible to achieve a natural sound expression that gives no uncomfortable feeling, according to the situation of the game at that time.

(Configuration 11)

According to Configuration 11, in any one of Configurations 1 to 10 described above, the information processing program may further cause the computer to: cause the object to perform collaborative work on an item placed in the virtual space; and perform the reproduction process of reproducing the reproduction sound when the object is performing the collaborative work.

According to the above configuration, as a sound expression such as "yelling" during collaborative work, it is possible to achieve a more natural sound expression.

According to the exemplary embodiments, it is possible to achieve a sound expression that gives a more natural feeling. In addition, by allowing the user to merely hear the sounds, the user can grasp the rough configuration of the object group.

BRIEF DESCRIPTION OF THE DRAWINGS

FIG. 23 shows a non-limiting example of first character data 303;

FIG. 24 shows a non-limiting example of transport voice data 304;

FIG. 28 shows a non-limiting example of group basic data 309;

FIG. 29 shows a non-limiting example of constituent member data 310;

FIG. 30 shows a non-limiting example of reproduction voice specification data 311;

DETAILED DESCRIPTION OF NON-LIMITING EXAMPLE EMBODIMENTS

Hereinafter, one exemplary embodiment will be described.

A game system according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
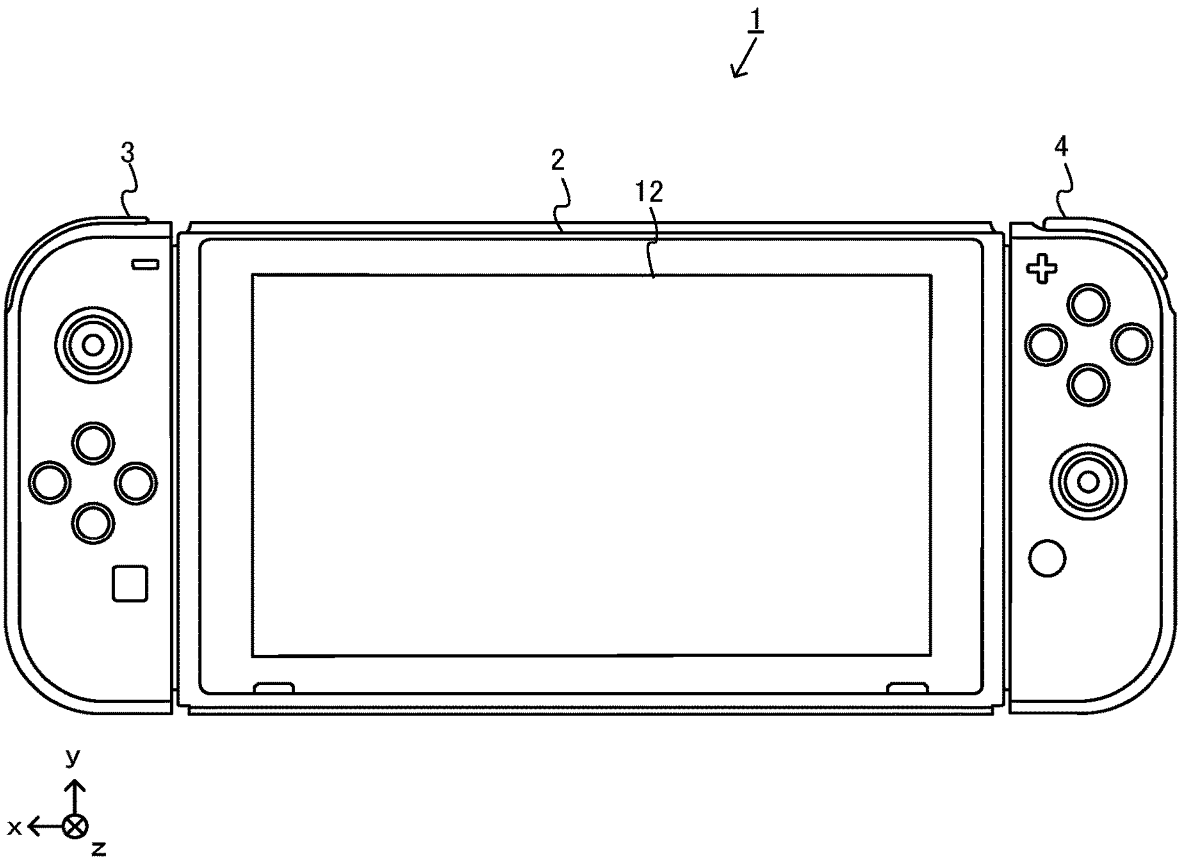
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
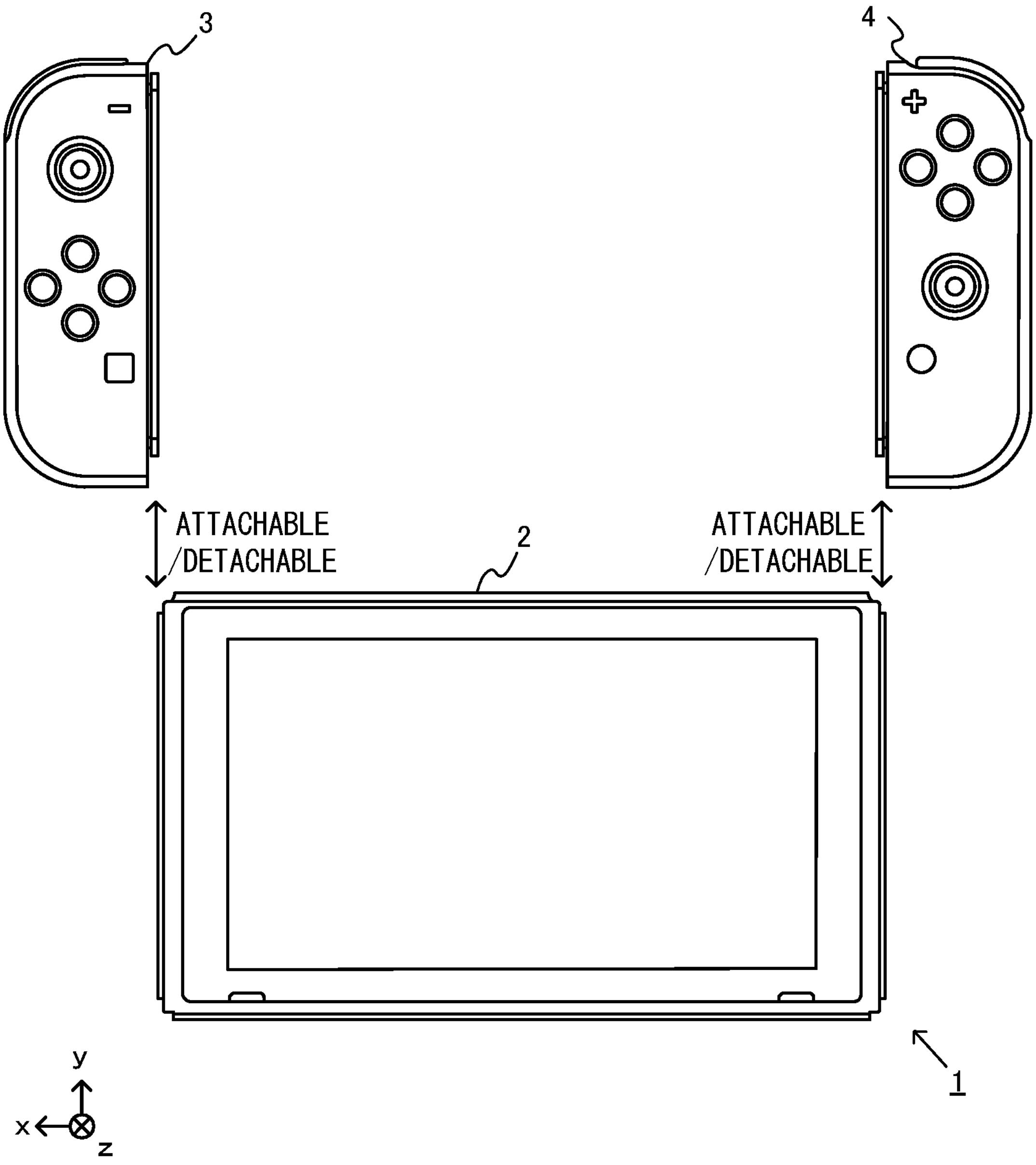
FIG. 2 shows a non-limiting example of a state in which the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

Figure 3:
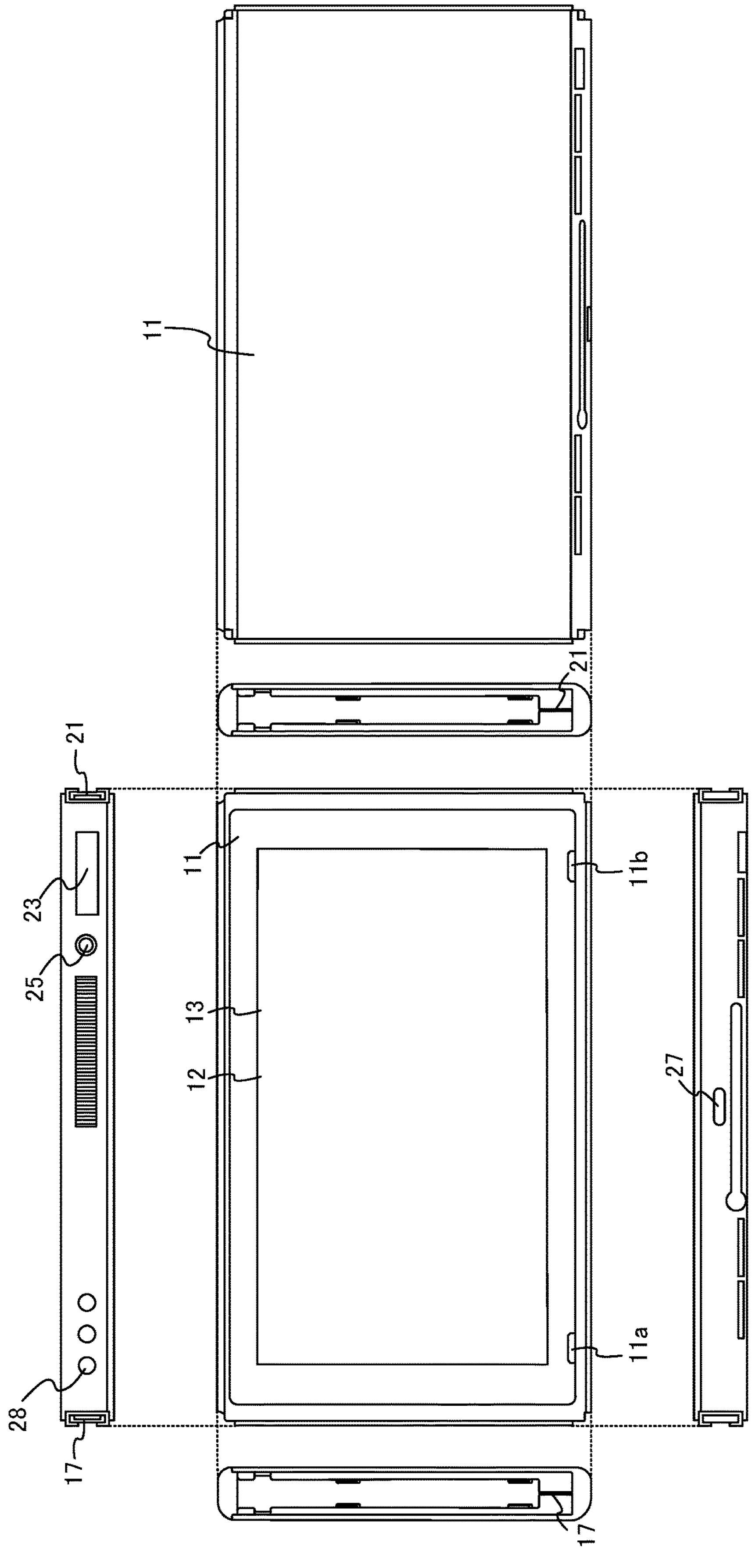
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11*a* and 11*b* are formed in the main surface of the housing 11. Then, sounds outputted from the speakers 88 are outputted through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
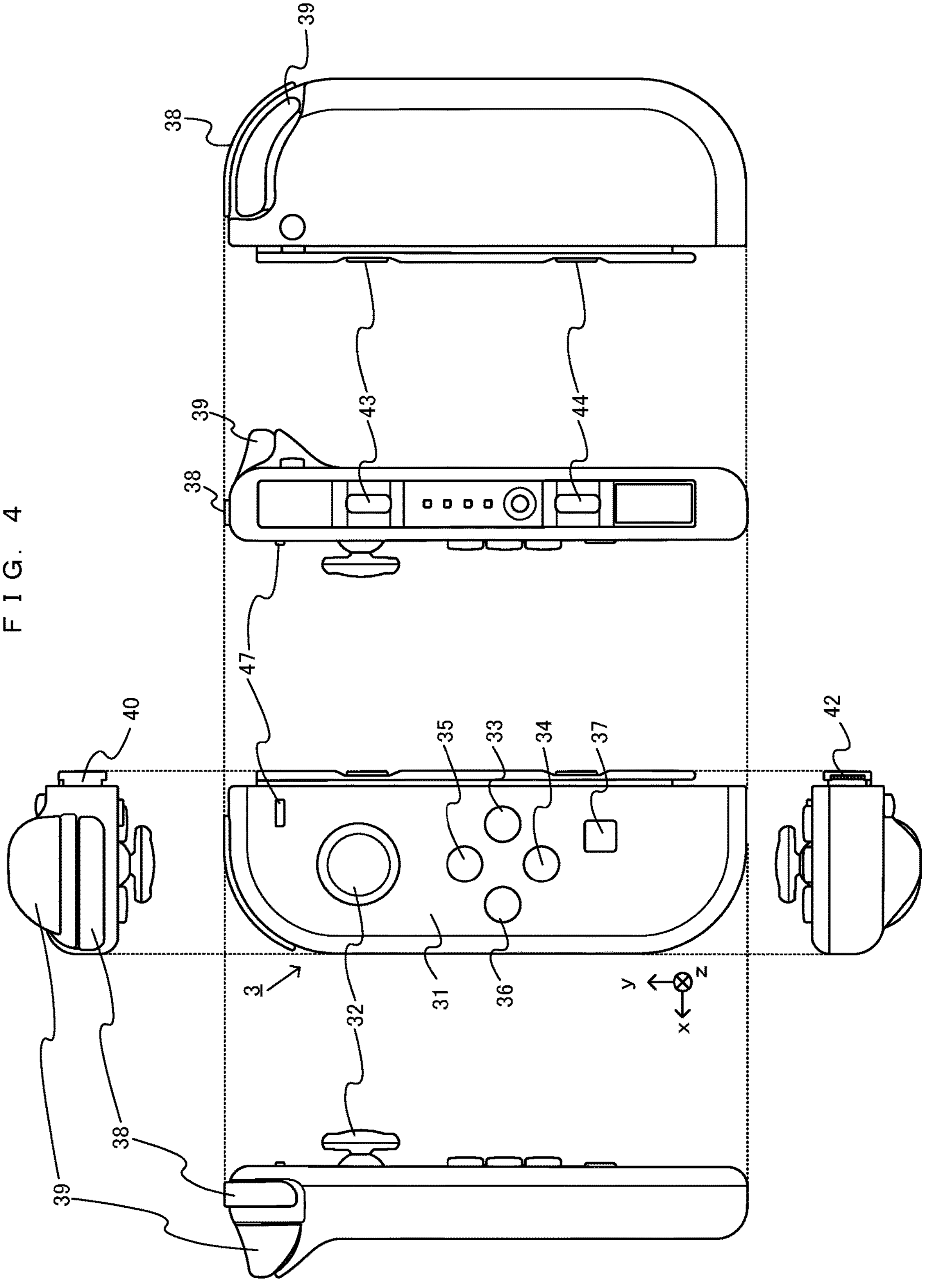
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "—" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
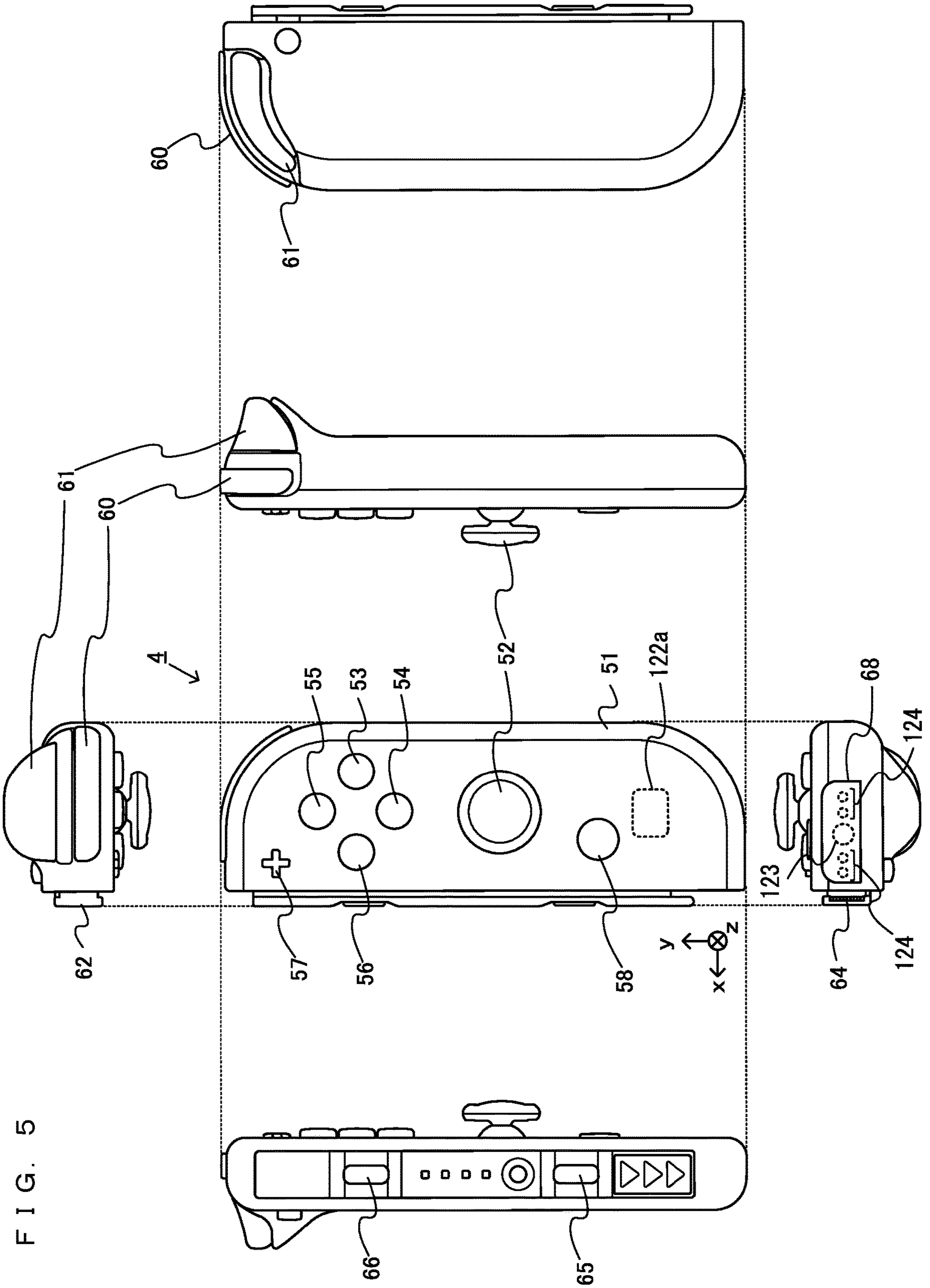
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
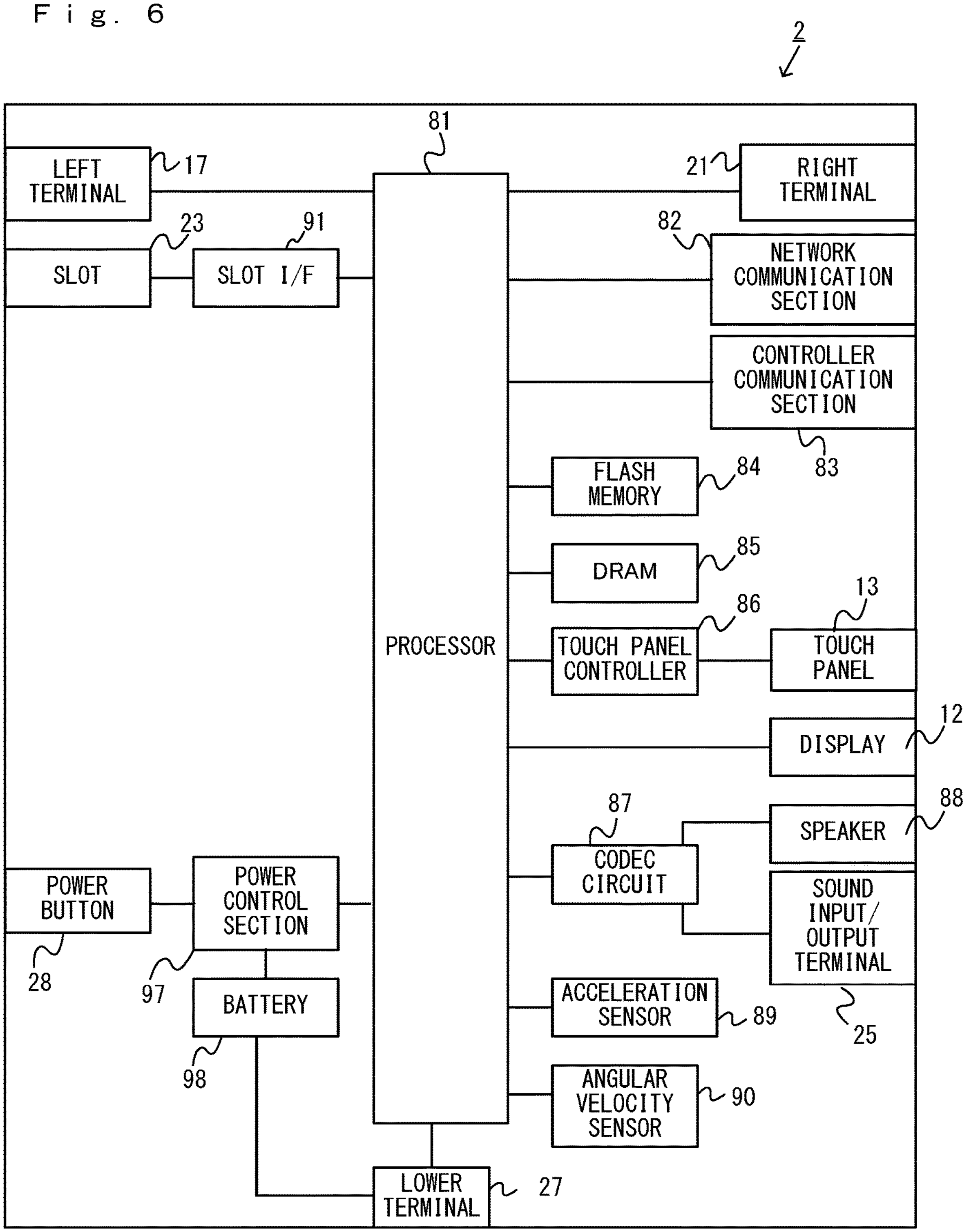
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
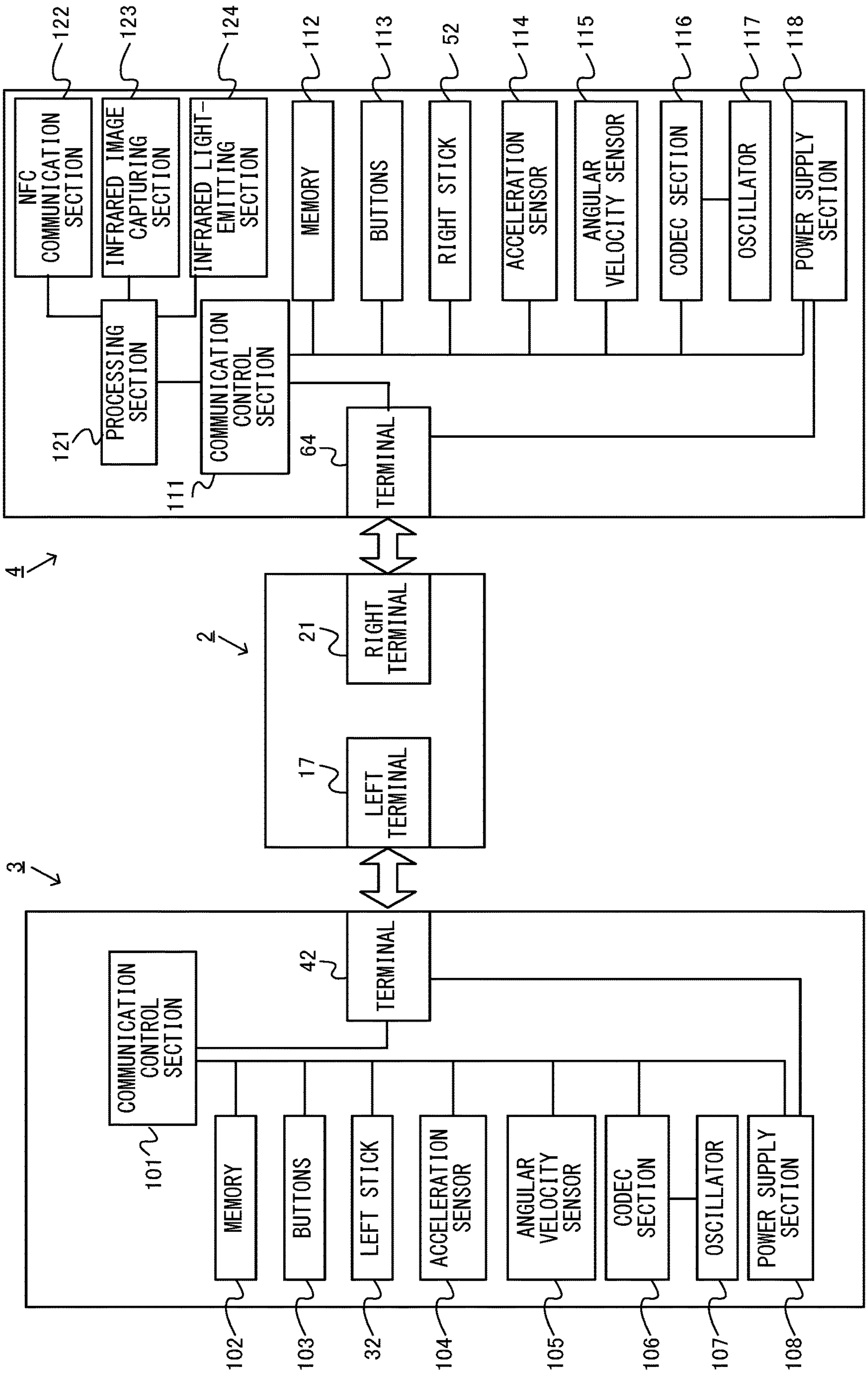
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Game Processing in Exemplary Embodiment]

Figure 8:
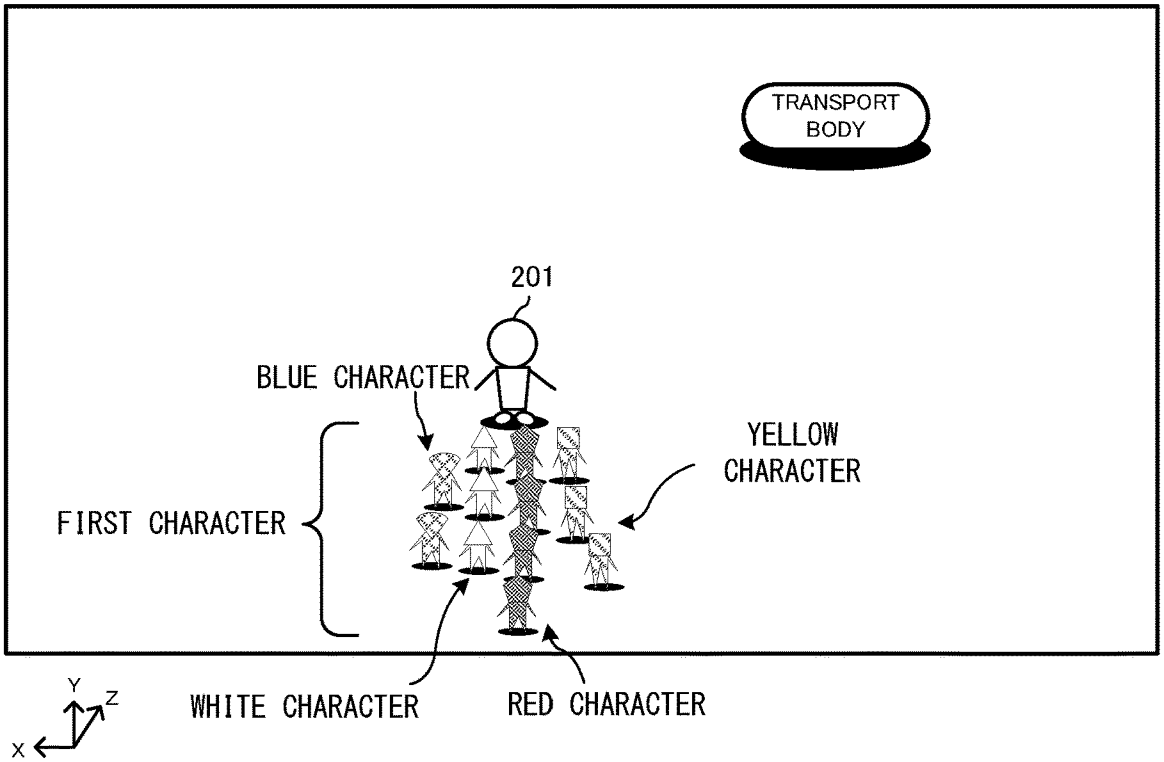
FIG. 8 shows a non-limiting example of a game screen according to an exemplary embodiment.

Next, an outline of operation of the game processing executed by the game system 1 according to the exemplary embodiment will be described. First, a game assumed in the exemplary embodiment will be described. FIG. 8 shows an example of a screen of the game according to the exemplary embodiment. The game is a game in which a player character object (hereinafter, referred to as PC) 201 displayed in a third person view is operated in a virtual three-dimensional space (hereinafter, referred to as virtual space). In the example in FIG. 8, in addition to the PC 201, a plurality of first character objects (hereinafter, referred to as first characters) are displayed. Moreover, one transport body object (hereinafter, simply referred to as transport body) is displayed at an upper right portion of the screen.

Next, the first characters will be described. The first characters are NPCs (non-player characters) associated with the PC 201. The first characters are biological character objects that act autonomously to some extent through AI control. Here, the game has a concept of "party". The "party" can be composed of one "leader" and a plurality of "members". The "leader" is the PC 201. The first characters can be "members". The first characters are scattered on a game field in a state where the first characters do not belong to any party. The user can add a predetermined first character to their own party by performing a predetermined operation. In the game, the PC 201 moves in a unit of the "party". Therefore, basically, the first characters move automatically so as to follow the movement of the PC 201.

Here, in the exemplary embodiment, the first characters are divided into a plurality of types, and each type has a different appearance and different characteristics (performance). In the exemplary embodiment, the case where there are four types of first characters will be described as an example. In addition, in the exemplary embodiment, it is assumed that the base color of the appearance is different for each type, and specifically, the base colors of the respective types are red, blue, white, and yellow. Therefore, in the following description, the respective types of first characters are referred to as "red character", "blue character", "white character", and "yellow character". The example in FIG. 8 shows a state where there are a total of 12 first characters that are the members of the party, and the first characters are arranged substantially in a vertical line for each type. As the details thereof, in order from the left vertical line, there are two blue characters, three white characters, four red characters, and three yellow characters.

In the game, by performing a predetermined operation, the user can cause the PC 201 to give a certain instruction to each first character. The first character performs various actions on the basis of the instruction. That is, the game is a game that can be advanced by giving instructions to the first characters and causing the first characters to perform various actions. As an example of the actions performed by the first characters, the first characters can be caused to attack an enemy character (not shown), to acquire an item, or to transport a predetermined transport body to a predetermined position.

How to give an instruction to each first character will be described. In the exemplary embodiment, the PC 201 can give an instruction to a first character by "throwing" the first character such that the first character lands in the vicinity of an object for which an action is desired to be performed. The first character that has landed executes a predetermined action corresponding to the type or the like of the object near the first character. For example, when one first character is selected from among the first characters in the party and is thrown such that the first character lands near an enemy character, the thrown first character starts attacking the enemy character after landing (attack power and attack speed thereof are different for each type). That is, in this case, an "attack instruction" is given by throwing. Furthermore, by throwing an additional first character toward the same enemy character (giving an attack instruction), the number of first characters to be caused to attack can also be increased. Similarly, for example, by throwing a first character to the vicinity of the transport body, the first character can be caused to transport the transport body toward a predetermined destination. That is, a "transport instruction" is given. The exemplary embodiment relates to processing regarding a situation of transporting the transport body. More specifically, the exemplary embodiment relates to control of reproduction of "transport voices" to be reproduced during transport. Hereinafter, an outline of action related to this transport and the processing of the exemplary embodiment will be described using screen examples.

Figure 9:
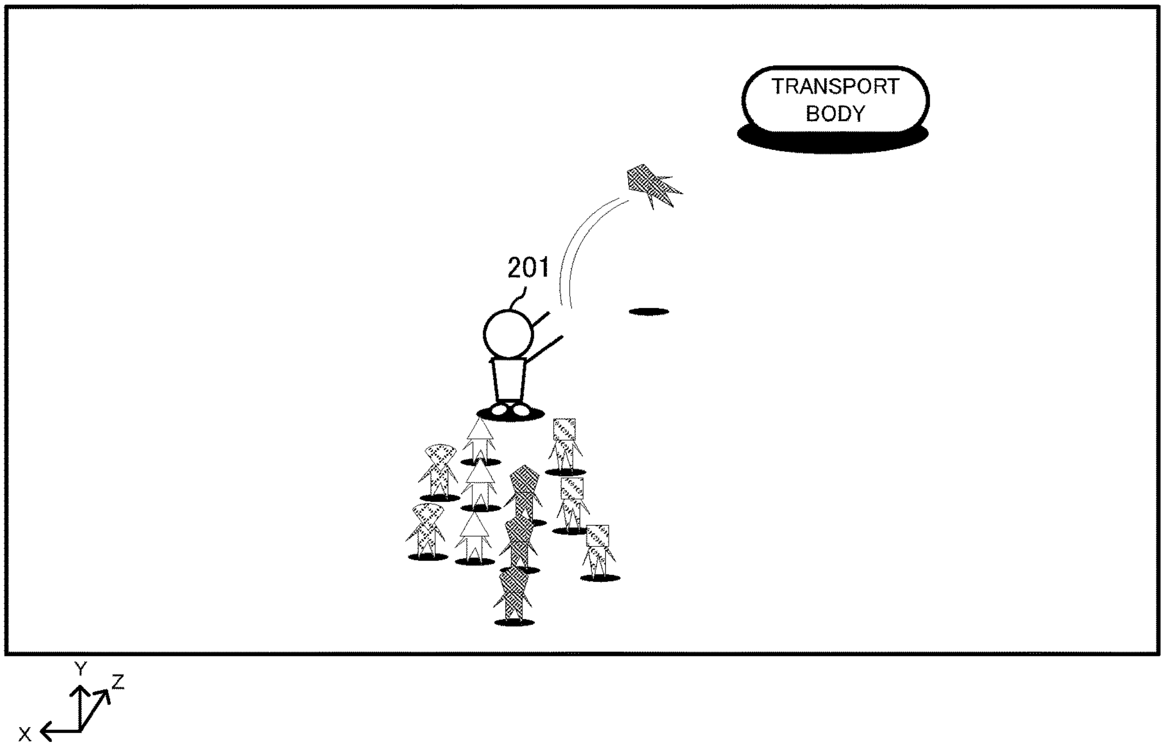
FIG. 9 shows a non-limiting example of the game screen according to the exemplary embodiment.

First, an example of start of the transport and action related to increasing the number of first characters to be caused to perform the transport will be described with reference to the drawings. It is assumed that the user desires to transport the transport body in the above state in FIG. 8. In this case, by performing a predetermined selection operation, the user selects a red character as an object to be thrown. Then, by performing a predetermined throwing operation, the user can cause the PC 201 to perform an action of throwing the red character toward the transport body as shown in FIG. 9.

Figure 10:
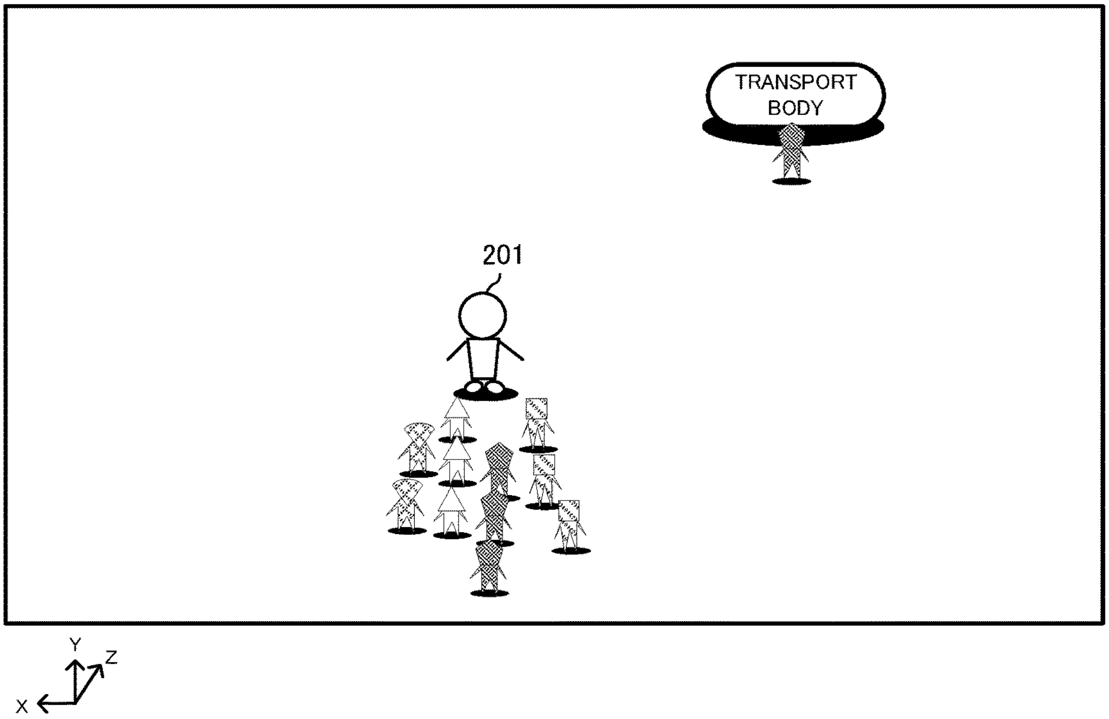
FIG. 10 shows a non-limiting example of a game screen according to the exemplary embodiment.
Figure 11:
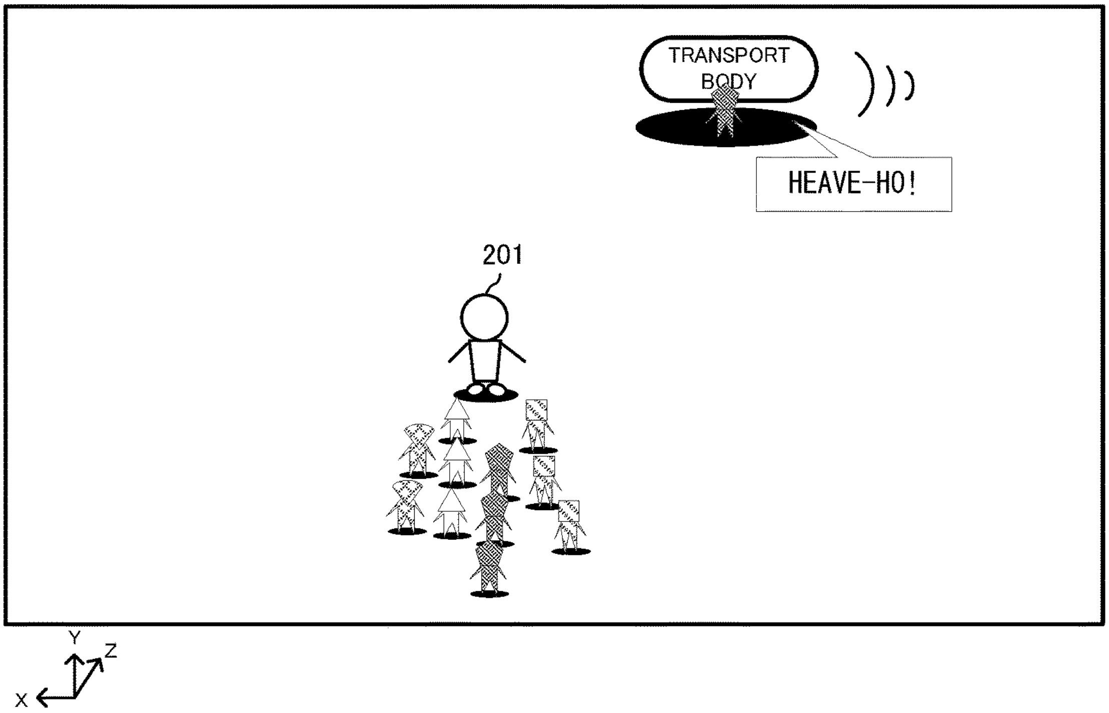
FIG. 11 shows a non-limiting example of the game screen according to the exemplary embodiment.

Then, as shown in FIG. 10, the thrown red character lands near the transport body. Then, as shown in FIG. 11, the red character lifts the transport body and starts transporting the transport body toward a predetermined destination. At this time, a "transport group" which is a group associated with the transport body is created. The transport group is a group composed of first characters that transport the transport body (hereinafter, the first characters are referred to as constituent members). However, at this time, the transport group only has this one red character as a constituent member. In addition, although described in detail later, transport voices (shown in a balloon in FIG. 11) described later are reproduced during transport as "yelling" made by the first characters.

Figure 12:
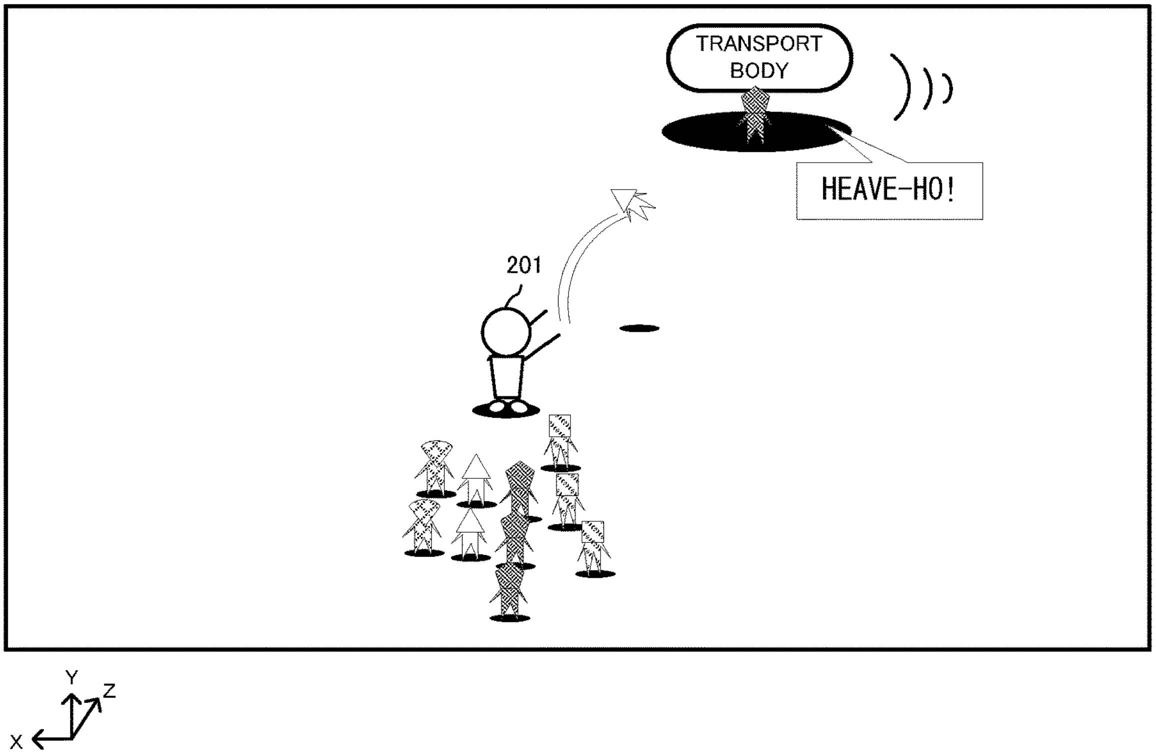
FIG. 12 shows a non-limiting example of the game screen according to the exemplary embodiment.
Figure 13:
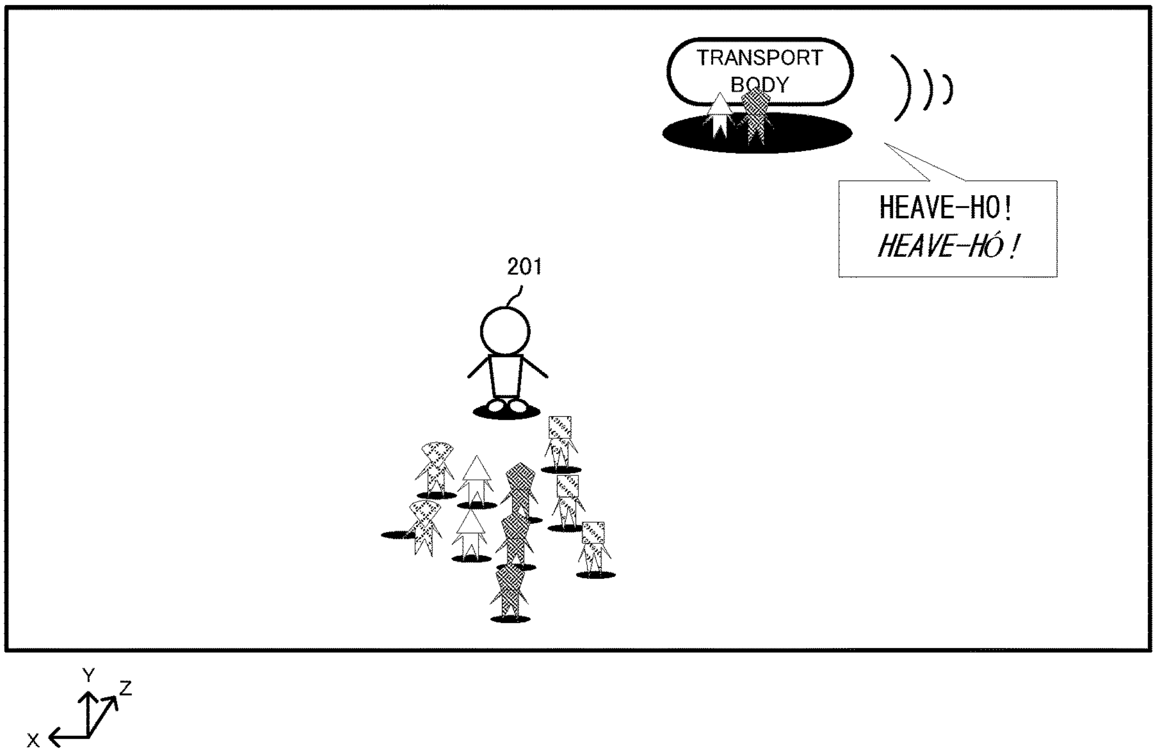
FIG. 13 shows a non-limiting example of the game screen according to the exemplary embodiment.

Furthermore, the number of constituent members of the transport group can be increased by throwing another first character toward the transport body (transport group). For example, when one white character is thrown as shown in FIG. 12, the white character is added to the transport group as shown in FIG. 13, thereby changing to a state where the transport body is transported by the two first characters.

Figure 14:
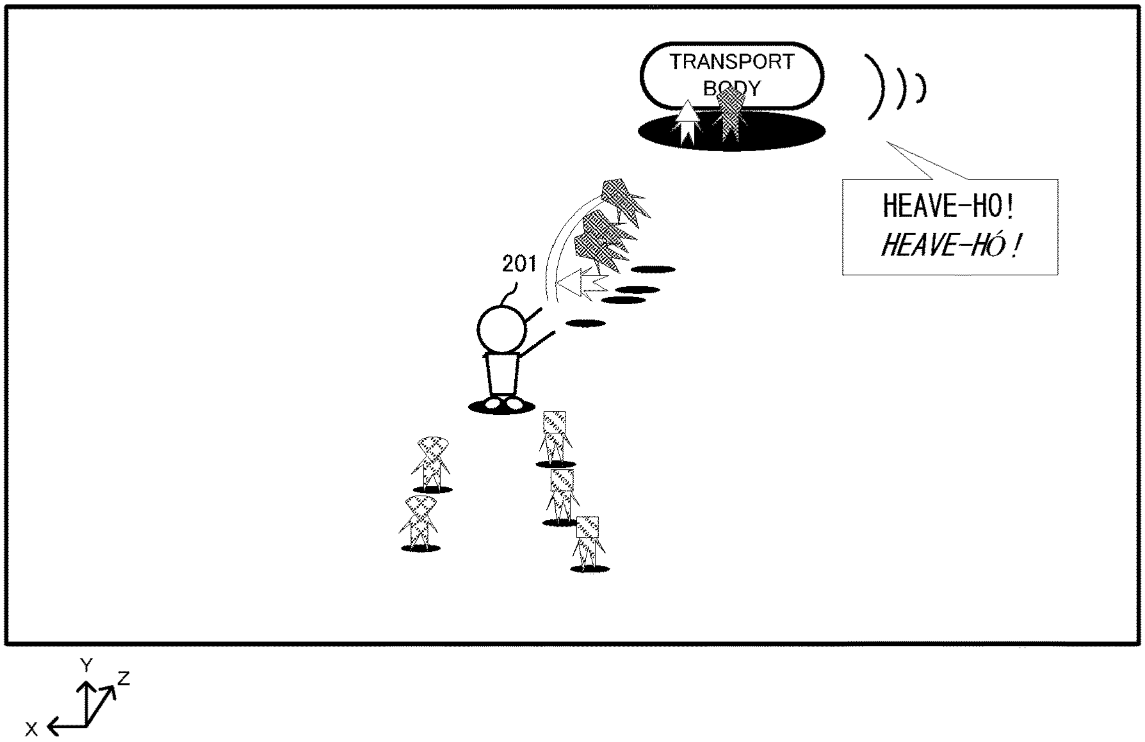
FIG. 14 shows a non-limiting example of the game screen according to the exemplary embodiment.
Figure 15:
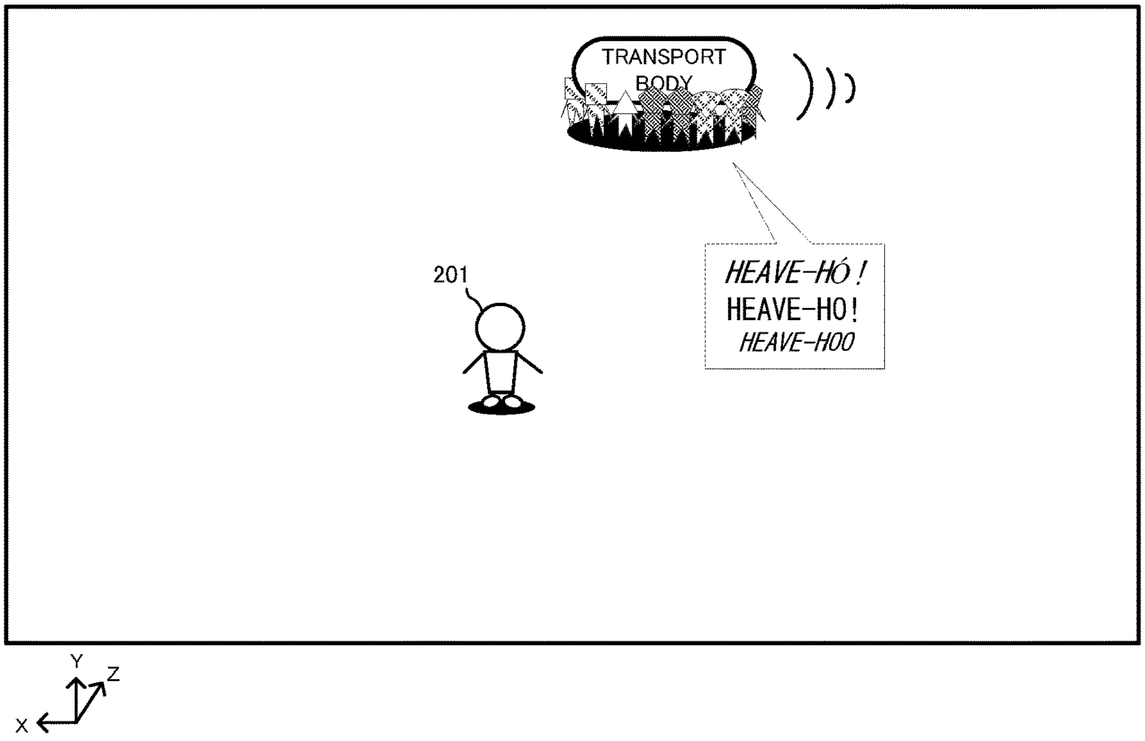
FIG. 15 shows a non-limiting example of the game screen according to the exemplary embodiment.

Then, the number of constituent members of the transport group can be further increased by performing an operation for further throwing a first character. FIG. 14 shows a state where a throwing operation is continuously performed, for example, by the user repeatedly pressing a button assigned to the throwing operation. FIG. 15 shows a state after all members of the party are added to the transport group (thrown to the transport group). In FIG. 15, a total of 12 first characters are transporting the transport body. In the exemplary embodiment, as the number of constituent members of the transport group increases, the transport speed of the transport body also increases. That is, by causing more first characters to transport the transport body, the transport body can be more speedily transported to the destination.

In the exemplary embodiment, by performing a predefined disbanding operation, the user can disband the transport group even in the middle of transport. For example, when the user performs the disbanding operation, the transport group is disbanded, and the constituent members of the transport group all return to the PC 201 (i.e., the movement is such that the first characters in the middle of transport are called to the PC 201). In addition, at this time, the transport body is left in place. If the transport group reaches the destination, the transport group is automatically disbanded.

Next, the transport voices will be described. As described above, the transport voices are reproduced as "yelling" while the first characters are transporting the transport body. Balloons shown in FIG. 11 to FIG. 15 indicate that the transport voices are being reproduced. In these drawings, one balloon indicates reproduction at one time. For example, the balloon in FIG. 13 indicates that two transport voices are being simultaneously reproduced. In the exemplary embodiment, control in which the number of transport voices to be simultaneously reproduced increases as the number of constituent members of the transport group increases, is performed. More specifically, the simultaneous reproduction number of transport voices and the sound content to be reproduced are determined according to the total number of first characters in the transport group and the ratio of the types thereof. Here, the "simultaneous reproduction" is not limited to the case where the timing of the start of reproduction of each transport voice is the same in a strict sense, but includes the case where the reproduction timings of the transport voices are slightly shifted from each other as long as the transport voices are heard such that the transport voices are reproduced substantially simultaneously.

Here, prior to description of the methods for determining the simultaneous reproduction number of transport voices, etc., the definition of each transport voice and a method for generating sound data will be described as a premise for the description. First, in the exemplary embodiment, a voice (transport voice) uttered by a voice actor is recorded as sound data. Then, in the exemplary embodiment, sound data of a transport voice by a different voice actor is prepared for each type of first character. That is, each type of first character has a different voice tone. The word of each transport voice may be different for each type, or the same word may be used for each type. In the case where the word is different, the voice actor and the word are different for each type of character. For example, the transport voice for the red characters is "heave-ho!" by a voice actor A, and the transport voice for the white characters is "yo-heave-ho" by a voice actor B. In the case where the words are the same, since there are four types of first characters in the exemplary embodiment, for example, when recoding a yell of the word “heave-ho”, voices of “heave-ho” uttered by four different voice actors are recorded, whereby sound data regarding a transport voice corresponding to each type is generated. In this case, since the uttering persons are different, the voice quality, tone, and the like are also different. Therefore, even though the word is the same, the word is heard in different ways.

Furthermore, in the exemplary embodiment, four types of sound data (four sound data) are prepared for each type of first character. For example, sound data of four different types of words by the same voice actor may be prepared as the sound data of transport voices for the red characters. Alternatively, four different sound data that are data of the same word by the same voice actor but are obtained by recording the word at different times, may be prepared. Even if the same word is uttered by the same voice actor, since the data are recorded at different times, the waveforms are not exactly the same, and thus the sound data can include slight variations. Therefore, the word can be heard slightly differently. Finally, for each type of first character, one of such four types of sound data is selected and reproduced as a transport voice.

As described above, in the exemplary embodiment, the transport voices (sound data) are different for each type of first character, and four types of transport voices (by the same voice actor) are prepared for the same type of first character in advance. Based on this premise, an outline of how to determine transport voices in the exemplary embodiment will be described below.

[Determination of Simultaneous Reproduction Number]

Figure 16:
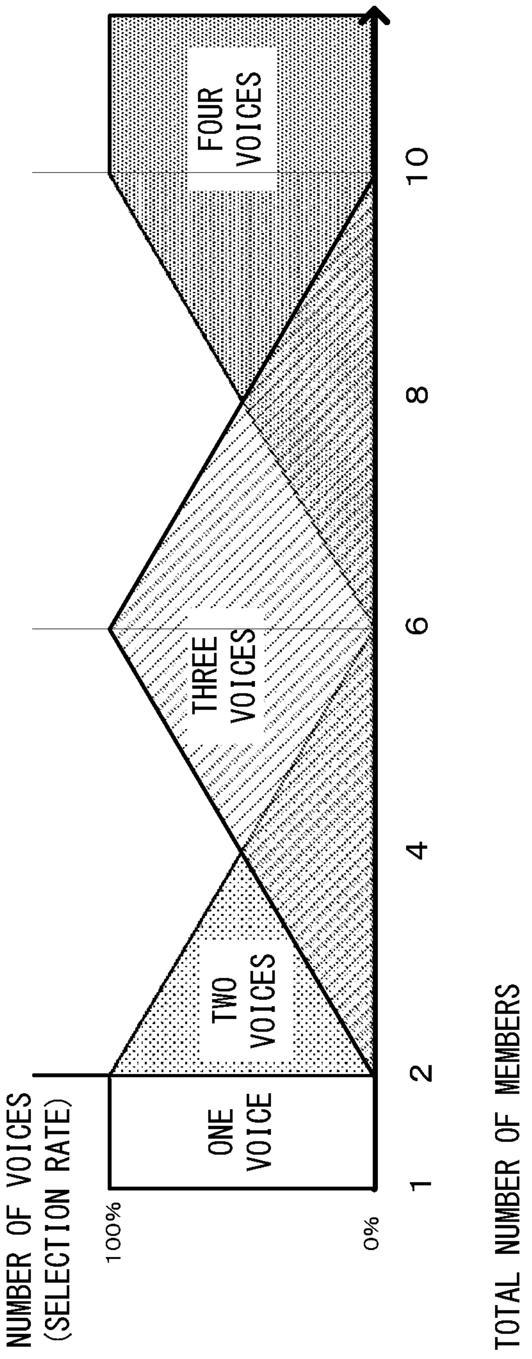
FIG. 16 shows a non-limiting example of a correlation between the total number of first characters and a simultaneous reproduction number.

In the exemplary embodiment, first, the number of transport voices to be simultaneously reproduced (hereinafter, simultaneous reproduction number) is determined through random selection on the basis of the total number of constituent members (first characters) of the transport group. FIG. 16 shows an example of a correlation between the total number of first characters and the simultaneous reproduction number in the exemplary embodiment. Basically, as the total number of constituent members increases, a probability that the simultaneous reproduction number will increase becomes higher. However, in the exemplary embodiment, the simultaneous reproduction number is not simply increased in proportion to the total number, but the increase in the simultaneous reproduction number with respect to the increase in the total number is gradually decreased. Specifically, as shown in FIG. 16, in the exemplary embodiment, the simultaneous reproduction number is determined as one if the total number of constituent members is one, is determined as two if the total number of constituent members is two, is determined as three if the total number of constituent members is six, and is determined as four if the total number of constituent members is ten or more. That is, the increase in the simultaneous reproduction number is gradually decreased as the total number of the constituent members increases. If the total number is three to five, two or three voices are selected through random selection as the simultaneous reproduction number. For example, a selection rate of two voices and a selection rate of three voices are respectively 75% and 25% if the total number is three, are respectively 50% and 50% if the total number is four, and are even 25% and 75% if the total number is five. If the total number is seven to nine, three or four voices are similarly selected through random selection as the simultaneous reproduction number. If the total number is ten or more, four voices are determined. By determining the simultaneous reproduction number through random selection on the basis of the total number of constituent members of the transport group as described above, a certain degree of randomness is provided to the simultaneous reproduction number to be reproduced in the case of a certain total number (e.g., four members).

After the simultaneous reproduction number is determined, the content of each transport voice to be actually reproduced is determined. In the exemplary embodiment, the content of the transport voice is determined as follows. First, a type of first character to reproduce (utter) the transport voice (hereinafter, a type in charge of reproduction) is determined through random selection. That is, which type of first character is to reproduce the transport voice is determined. Here, as for the number of times of random selection, the simultaneous reproduction number determined as described above is set as an upper limit thereof. For example, if the simultaneous reproduction number is two, random selection is performed twice, and if the simultaneous reproduction number is three, random selection is performed three times. Then, the selection rate at each random selection is set to be a selection rate (probability) based on the ratio of the types of first characters in the transport group. For example, if there are two constituent members in total that are one red character and one blue character, the ratio is 1:1, and thus 50% is set as a selection rate of the type in charge of reproduction for each of the red character and the blue character. In addition, for example, if there are four constituent members in total that are three red characters and one blue character, each selection rate is set so as to satisfy a ratio of 3:1. Specifically, the selection rate is set to 75% for the red characters, and is set to 25% for the blue character. In addition, for example, if the total number of constituent members is ten and the constituent members are five red characters, two blue characters, two white characters, and one yellow character, the ratio therebetween is 5:2:2:1, and selection rates of 50%, 20%, 20%, and 10% are set for the respective types of characters.

[Determination of Sound Data to be Reproduced]

After the type in charge of reproduction is determined, sound data to be reproduced is specified for each type. As described above, in the exemplary embodiment, the four types of sound data are prepared for each type of first character. In the exemplary embodiment, one of these types of sound data is determined through random selection. In the exemplary embodiment, it is assumed that random selection is performed with a selection rate being set to 25% for each type of sound data. Therefore, for example, it is assumed that the simultaneous reproduction number is two, and the types in charge of reproduction are “red character, red character”. In this case, the four types of sound data associated with the red character are referred to as Voice A to Voice D. Voice A and Voice B may be determined through random selection and reproduced simultaneously. Alternatively, in such a case, Voice A (the same sound data) may be determined through random selection as each of two voices. In this case, the Voices A are reproduced simultaneously, and as a result, the reproduction volume of the Voices A can be higher (than that when only one voice is reproduced).

In another exemplary embodiment, the above determination is not limited to determination from the four types of sound data through random selection, and the four types of sound data may be selected in a predetermined order.

Figure 17:
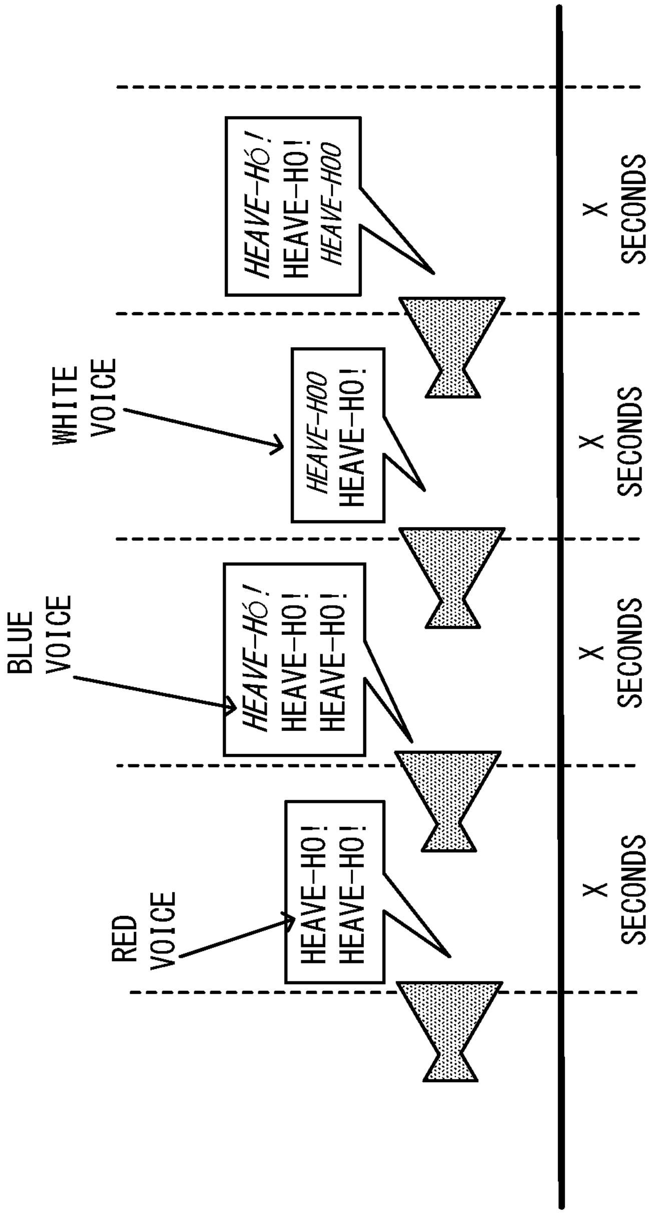
FIG. 17 shows a non-limiting example of reproduction of transport voices.

By determining the simultaneous reproduction number on the basis of the total number of constituent members of the transport group and determining the type in charge of reproduction on the basis of the component ratio of the types of first characters as described above, for example, transport voices can be reproduced as shown in FIG. 17. FIG. 17 is a schematic diagram showing, in chronological order in the right direction, an example of transport voices in the case where the total number is four and the constituent members are two red characters, one blue character, and one white character. FIG. 17 shows that the transport voices are reproduced four times. In addition, the interval (reproduction interval) from the start of reproduction of each transport voice to the start of reproduction of the next transport voice is X seconds. FIG. 17 shows that, at the first reproduction, two voices are simultaneously reproduced as transport voices of the red characters (hereinafter, referred to as red voices). Also, FIG. 17 shows that, at the second reproduction, three voices are simultaneously reproduced, that is, one transport voice of the blue character (hereinafter, referred to as blue voice: shown in bold italics in FIG. 17) and two red voices are simultaneously reproduced. FIG. 17 shows that, at the third reproduction, two voices including one transport voice of the white character (hereinafter, referred to as white voice: shown in italics in FIG. 17) and one red voice are simultaneously reproduced. At the fourth reproduction, three voices are simultaneously reproduced, and include one blue voice, one red voice, and one white voice. That is, the simultaneous reproduction number is determined through random selection as described above, which indicates that the simultaneous reproduction number has a certain degree of randomness. The types in charge of reproduction at each timing are also different, which indicates that the types in charge of reproduction also have randomness.

Figure 18:
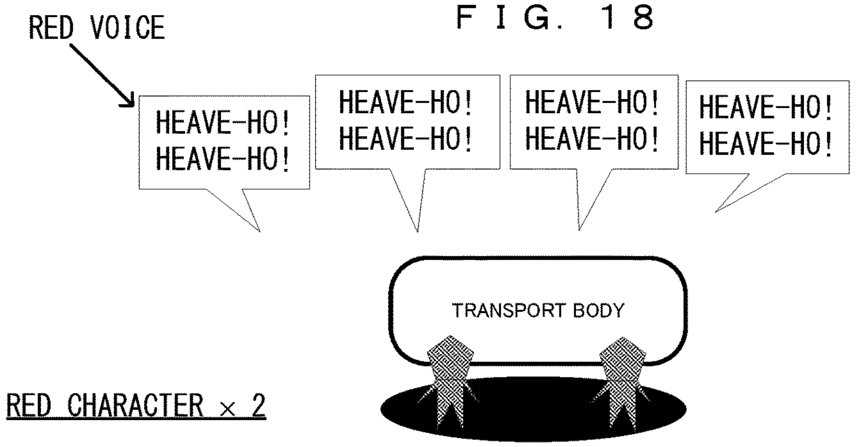
FIG. 18 shows a non-limiting example of reproduction at different first character component ratios.
Figure 19:
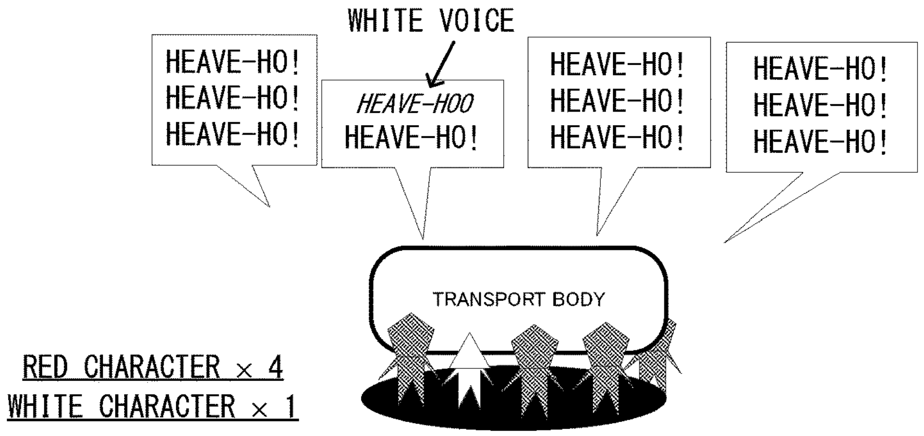
FIG. 19 shows a non-limiting example of reproduction at different first character component ratios.
Figure 20:
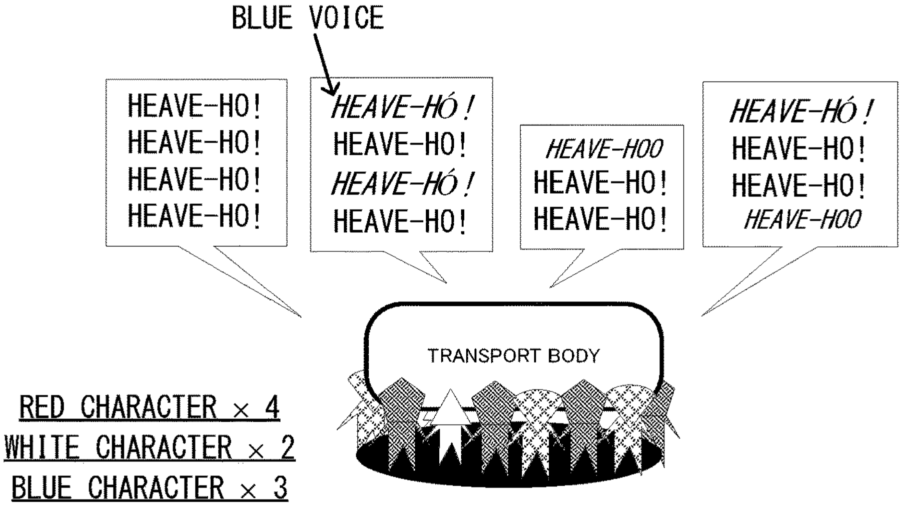
FIG. 20 shows a non-limiting example of reproduction at different first character component ratios.

FIG. 18 to FIG. 20 show examples of reproduction at different first character component ratios. FIG. 18 to FIG. 20 each show reproduction of transport voices at four times. In FIG. 18, there are two red characters, and in this case, two voices are determined as the simultaneous reproduction number as described above with reference to FIG. 16. Therefore, two voices that are a combination of "red voice and red voice" are simultaneously reproduced at four times. Also, FIG. 19 is an example of a ratio of four red characters and one white character. In this case, the total number is five, and thus two or three voices are determined through random selection as the simultaneous reproduction number. In this example, two voices are simultaneously reproduced only at the second time, and three voices are simultaneously reproduced at the other times. In addition, a white voice which has a low component ratio is reproduced only at the second time. FIG. 20 is an example of a component ratio of four red characters, two white characters, and three blue characters. In this case, the total number is nine, and thus three or four voices are determined through random selection as the simultaneous reproduction number as described above with reference to FIG. 16. This example shows that three voices are simultaneously reproduced only at the third time. In addition, the transport voices to be reproduced are red voices (ten voices in total), blue voices (three voices in total), and white voices (two voices in total) in order of a larger number of voices. In the example in FIG. 20, only the red voices are heard at the first reproduction, and the red voices and the blue voices are heard at the second reproduction. Furthermore, the red voices are heard at the third reproduction such that the white voice is mixed therein, and the red voices, the white voice, and the blue voice are heard so as to be mixed together at the fourth reproduction. The above reproduction control enables a sound expression that is like "living creatures" and that gives a more natural feeling, as for the reproduced transport voices.

In the exemplary embodiment, the transport speed increases as the number of constituent members increases, and the reproduction speed of the transport voices is also controlled to increase as the transport speed increases.

[Details of Game Processing According to Exemplary Embodiment]

Next, the game processing in the exemplary embodiment will described in more detail with reference to FIG. 21 to FIG. 34.

[Data to be Used]

Figure 21:
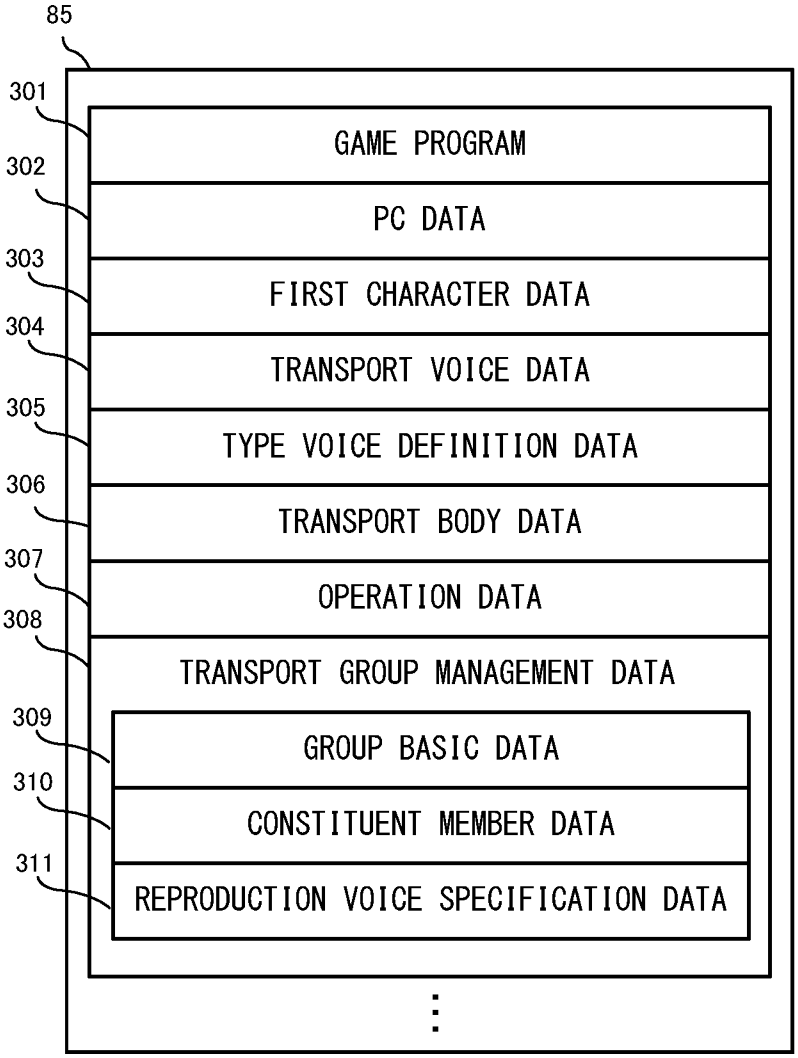
FIG. 21 illustrates a memory map showing a non-limiting example of various kinds of data stored in a DRAM 85.

First, various kinds of data to be used in the game processing will be described. FIG. 21 illustrates a memory map showing an example of various kinds of data stored in the DRAM 85 of the main body apparatus 2. In the DRAM 85 of the main body apparatus 2, a game program 301, PC data 302, first character data 303, transport voice data 304, type voice definition data 305, transport body data 306, operation data 307, transport group management data 308, etc., are stored.

The game program 301 is a program for executing the game processing in the exemplary embodiment. This program also includes a program for realizing the above-described control of reproduction of transport voices.

Figure 22:
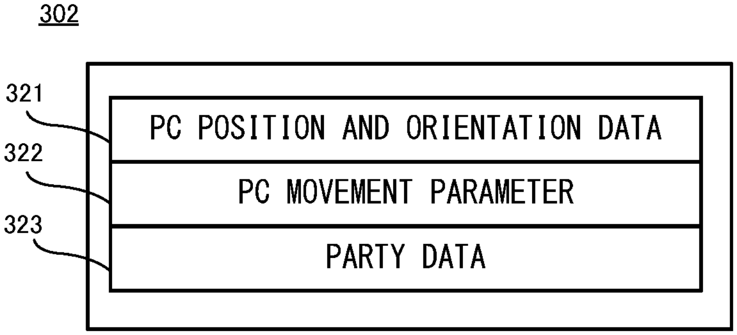
FIG. 22 shows a non-limiting example of PC data 302.

The PC data 302 is data regarding the above PC 201. FIG. 22 illustrates an example of the data structure of the PC data 302. The PC data 302 includes at least PC position and orientation data 321, a PC movement parameter 322, and party data 323.

The PC position and orientation data 321 is data indicating the current position and the current orientation of the PC 201 in the virtual space.

The PC movement parameter 322 is data used for controlling the movement of the PC 201. For example, the PC movement parameter 322 includes parameters indicating a movement direction, a movement speed, etc., of the PC 201.

The party data 323 is data that defines the content of the above party having the PC 201 as a leader. The party data 323 includes at least information for specifying the first characters that join the party.

In addition, the PC data 302 includes various kinds of data for forming the appearance of the PC 201 (three-dimensional model data, texture data, etc.) and data that defines animations of various actions to be performed by the PC 201.

Referring back to FIG. 21, the first character data 303 is data regarding the above first characters. The first character data 303 is a database consisting of a set of records each including items shown in FIG. 23. In FIG. 23, each record includes at least items such as a first character ID 331, a character type 332, a current position 333, an affiliation 334, an action state 335, and an action parameter 336.

The first character ID 331 is an ID for uniquely identifying a first character. The character type 332 is data indicating which of the above four types the first character is. In this example, any one of "red", "blue", "white", and "yellow" is stored as the content of this data.

The current position 333 is information indicating the current position of the first character in the virtual game space. The affiliation 334 is data indicating whether or not the first character currently belongs to the party of the PC 201. In this example, as the content of this data, "PC" is set if the first character belongs to the party of the PC 201, and "not belonging" is set if the first character does not belong to the party of the PC 201.

The action state 335 is data indicating the current state of the first character. As the state of the first character, for example, "waiting", "moving", "being thrown", "transporting", "attacking", or the like is set. The action parameter 336 includes various parameters for controlling the action of the first character. For example, if the action state 335 is "moving" or "transporting", parameters indicating a movement direction and a movement speed are set. In addition, if the action state 335 is "attacking", information indicating an attacking target, and parameters indicating attack power and the like are set.

In addition, although not shown, each record of the first character data 303 may include, for example, various kinds of information required for the game processing, such as the hit point (HP) and the current orientation of the first character.

Referring back to FIG. 21, the transport voice data 304 is sound data of the above transport voices. Specifically, the transport voice data 304 is a database consisting of a set of records each including items such as a voice ID 341 and a sound content 342 shown in FIG. 24. The voice ID 341 is an ID (e.g., sound data name) for specifying each transport voice, and the sound content 342 is specific sound data (e.g., WAV format data) of the transport voice.

Figures 25, 26, 27:
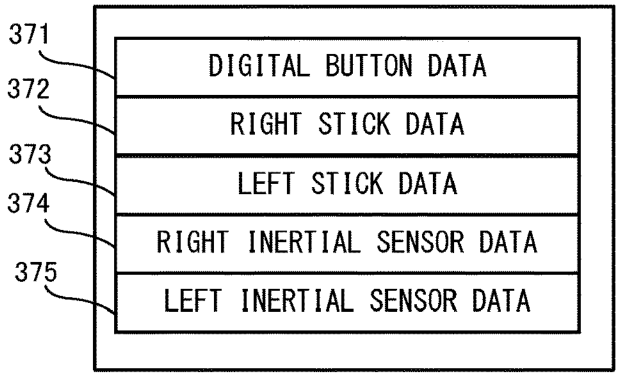
FIG. 25 shows a non-limiting example of type voice definition data 305.
FIG. 26 shows a non-limiting example of transport body data 306.
FIG. 27 shows a non-limiting example of operation data 307.

Referring back to FIG. 21, the type voice definition data 305 is data that defines the correspondence between each type of first character and the data of the above four types of transport voices. The type voice definition data 305 is a database consisting of a set of records each including items shown in FIG. 25. In FIG. 25, each record includes at least items such as a character type 351, a first voice 352, a second voice 353, a third voice 354, and a fourth voice 355. The character type 351 is data that specifies one of the above four types of first characters. For each type, the voice IDs 341 of the transport voice data 304 are stored as the first voice 352, the second voice 353, the third voice 354, and the fourth voice 355 in association with each other.

Referring back to FIG. 21, the transport body data 306 is data regarding the above transport body. FIG. 26 illustrates an example of the data structure of the transport body data 306. The transport body data 306 is a database consisting of a set of records each including at least items such as a transport body ID 361 and a current position 362. The transport body ID 361 is an ID for uniquely identifying each transport body. The current position 362 is data indicating the current position of the transport body in the virtual space. In addition, although not shown, the transport body data 306 also includes various kinds of information for forming the appearance of the transport body, information indicating the weight of the transport body (which affects a transport speed), and, for example, information that defines the characteristics of the transport body, etc.

Referring back to FIG. 21, the operation data 307 is data obtained from the controller operated by the user. That is, the operation data 307 is data indicating the content of an operation performed by the user. FIG. 27 illustrates an example of the data structure of the operation data 307. The operation data 307 includes at least digital button data 371, right stick data 372, left stick data 373, right inertial sensor data 374, and left inertial sensor data 375. The digital button data 371 is data indicating pressed states of various buttons of the controllers. The right stick data 372 is data for indicating the content of an operation on the right stick 52. Specifically, the right stick data 372 includes two-dimensional data of x and y. The left stick data 373 is data for indicating the content of an operation on the left stick 32. The right inertial sensor data 374 is data indicating the detection results of the inertial sensors such as the acceleration sensor 114 and the angular velocity sensor 115 of the right controller 4. Specifically, the right inertial sensor data 374 includes acceleration data for three axes and angular velocity data for three axes. The left inertial sensor data 375 is data indicating the detection results of the inertial sensors such as the acceleration sensor 104 and the angular velocity sensor 105 of the left controller 3.

Referring back to FIG. 21, the transport group management data 308 is data for managing the above transport group. The transport group management data 308 includes group basic data 309, constituent member data 310, and reproduction voice specification data 311.

The group basic data 309 is data indicating basic information of the transport group. Specifically, the group basic data 309 is a database consisting of a set of records each including items shown in FIG. 28. In FIG. 28, each record includes at least items such as a group ID 391, a transport body ID 392, destination information 393, current position information 394, a transport speed parameter 395, a mid-reproduction flag 396, and virtual speaker position information 397.

The group ID 391 is an ID for uniquely identifying each transport group (in the exemplary embodiment, a plurality of transport groups can coexist).

As the transport body ID 392, the transport body ID 361 of the transport body data 306 indicating the transport body to be transported is set.

The destination information 393 is information indicating the destination of the transport group. When the transport group is created, the destination is set as appropriate according to the game development, the game situation, etc.

The current position information 394 is information indicating the current position of the transport group.

The transport speed parameter 395 is a parameter that defines the transport speed of the transport group. As described above, the transport speed is set so as to increase as the number of constituent members of the transport group increases.

The mid-reproduction flag 396 is a flag indicating whether or not transport voices for the transport group are currently being reproduced. If the mid-reproduction flag 396 is ON, it indicates that transport voices are being reproduced.

The virtual speaker position information 397 is information that defines the position of a virtual speaker that emits transport voices for the transport group. In the exemplary embodiment, the number of virtual speakers that emit transport voices is only one. The position of the virtual speaker is the position of the center of gravity of the constituent members of the transport group. In addition, in the exemplary embodiment, such a position of the center of gravity is defined as a position relative to the current position information 394 (i.e., the position of the virtual speaker moves so as to follow the movement of the transport group).

Referring back to FIG. 21, the constituent member data 310 is data indicating the constituent members (first characters) included in each transport group. Specifically, the constituent member data 310 is a database consisting of a set of records each including a group ID 401 and a constituent member ID 402 shown in FIG. 29. The group ID 401 is an ID for identifying the transport group, and corresponds to the group ID 391 in the group basic data 309. As the constituent member ID 402, the first character ID 331 of each of first characters that are the constituent members of the transport group is set.

Referring back to FIG. 21, the reproduction voice specification data 311 is data indicating which sound data is used as each transport voice for the transport group. Specifically, the reproduction voice specification data 311 is a database consisting of a set of records each including items shown in FIG. 30. In FIG. 30, each record includes items such as a group ID 411, a reproduction voice ID 412, and reproduction speed information 413. The group ID 411 is an ID for identifying a transport group, and corresponds to the group ID 391 in the group basic data 309. As the reproduction voice ID 412 and the reproduction speed information 413, four data sets are assigned to each group. As the reproduction voice ID 412, the voice ID 341 of each sound data to be reproduced as a transport voice is set. The reproduction speed information 413 is a parameter that defines a sound reproduction speed for each transport voice.

In addition, various kinds of data required for the game processing are also generated as appropriate and stored in the DRAM 85.

[Details of Processing Executed by Processor 81]

Next, the details of the game processing in the exemplary embodiment will be described. Here, control related to the above-described control of reproduction of transport voices will be mainly described, and the detailed description of other various kinds of game processing is omitted. In the exemplary embodiment, flowcharts described below are realized by one or more processors reading and executing the above program stored in one or more memories. The flowcharts are merely an example of the processing. Therefore, the order of each process step may be changed as long as the same result is obtained. In addition, the values of variables and thresholds used in determination steps are also merely examples, and other values may be used as necessary.

Figure 31:
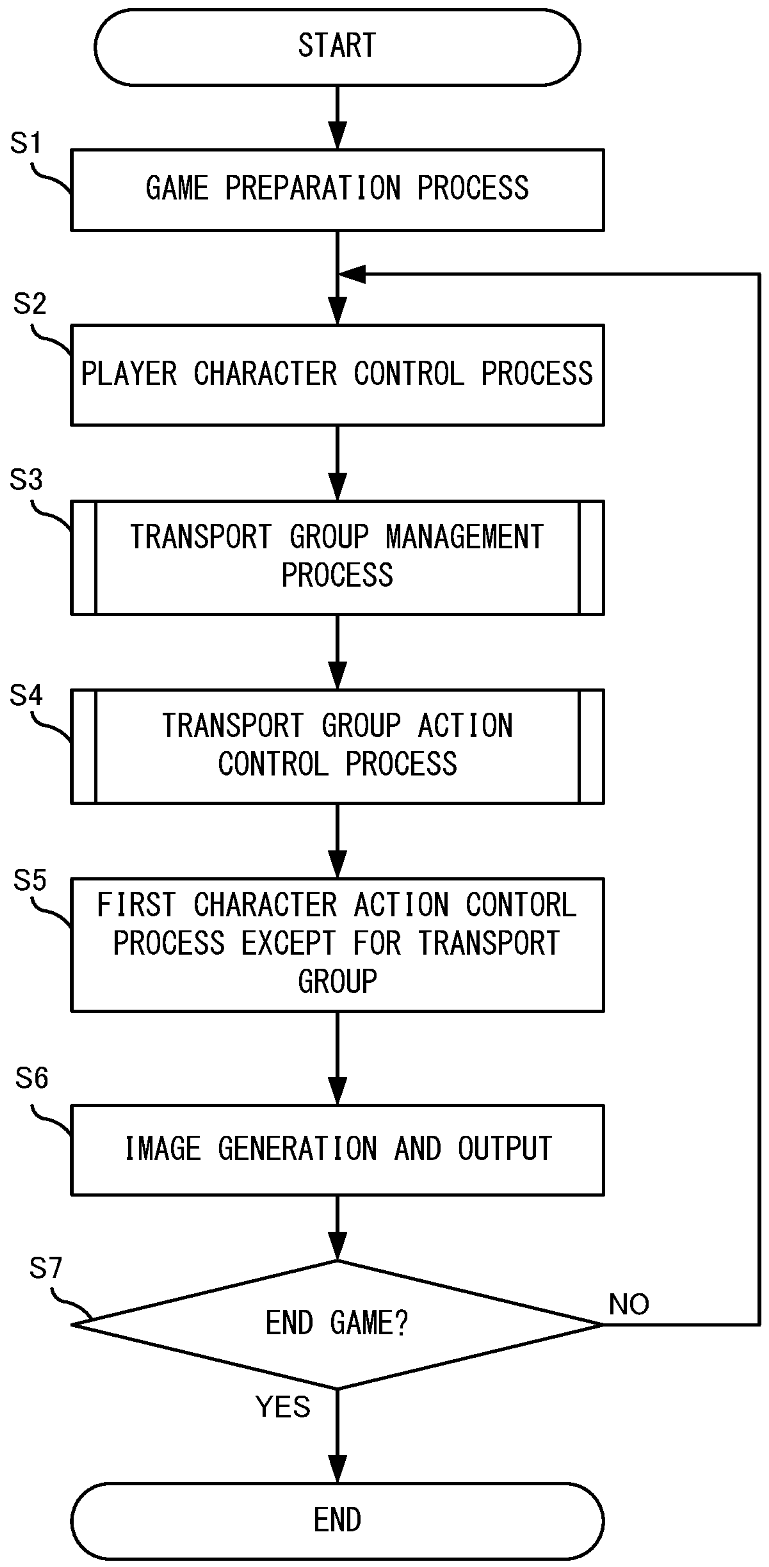
FIG. 31 is a flowchart showing the details of game processing according to the exemplary embodiment.

FIG. 31 is a flowchart showing the details of the game processing according to the exemplary embodiment. A process loop of steps S2 to S7 in FIG. 31 is repeatedly executed every frame period.

[Preparation of Game]

In FIG. 31, in step S1, the processor 81 executes a game preparation process. In this process, the processor 81 constructs a virtual space and places the PC 201, the first characters, and the transport body therein as appropriate. Then, the processor 81 takes an image of the virtual space with the virtual camera to generate a game image, and outputs the game image. In addition, the processor 81 loads various kinds of data required for the game processing, into the DRAM 85, and initializes variable data such as various flags and variables as appropriate. In particular, the sound data of transport voices are loaded into the DRAM 85 as the transport voice data 304 at this time, thereby allowing sound reproduction to be quickly started in processing described below.

Next, in step S2, the processor 81 executes a player character control process. In this process, a process for reflecting the content of an operation by the user in the action of the PC 201 is performed. Specifically, the processor 81 acquires the operation data 307. Furthermore, the processor 81 causes the PC 201 to perform a predetermined action, on the basis of the content of the operation. For example, the processor 81 causes the PC 201 to perform an action of moving, an action of throwing a first character, an action of disbanding a transport group, or the like. In addition, the contents of the affiliation 334, the action state 335, and the action parameter 336 of the first character are updated as appropriate in accordance with the action of the PC 201. For example, when an action of throwing a first character is performed, "being thrown" is set as the action state 335 of the first character to be thrown, and a movement parameter for moving by being thrown is set as appropriate as the action parameter 336.

Figure 32:
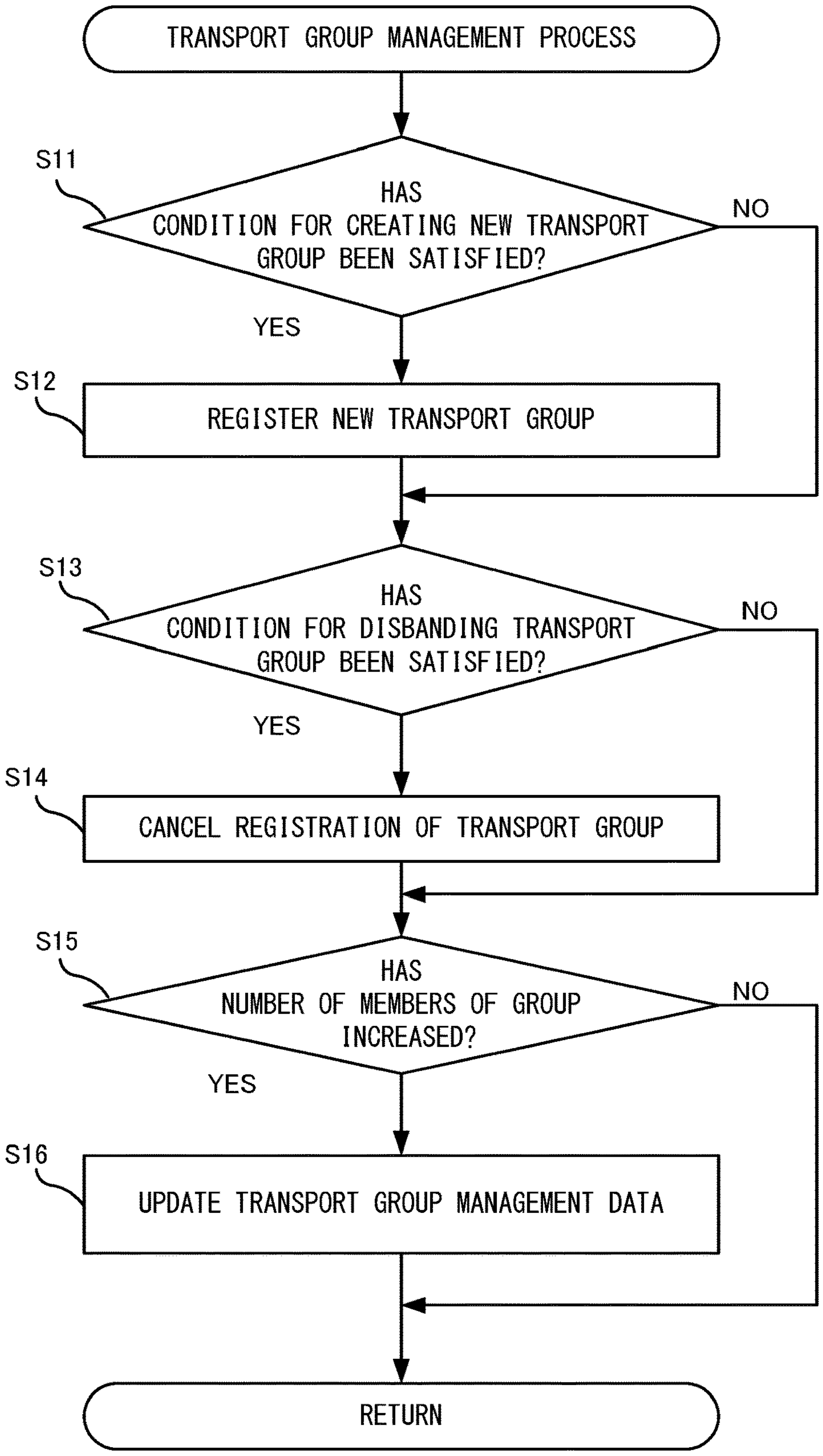
FIG. 32 is a flowchart showing the details of a transport group management process.

Next, in step S3, the processor 81 executes a transport group management process. In this process, a process for managing the configuration of a transport group such as creating a transport group is performed on the basis of the content of the operation by the user. FIG. 32 is a flowchart showing the details of the transport group management process. In FIG. 32, first, in step S11, the processor 81 determines whether or not a condition for creating a new transport group has been satisfied. The condition is, for example, that a new transport instruction is performed for a transport body that is not associated with any transport group. As described above, by throwing a predetermined first character to the vicinity of the transport body, a transport instruction for the first character to transport the transport body can be given. Therefore, whether or not a new transport instruction has been performed is determined by determining whether or not an operation for throwing a first character to the vicinity of a transport body that is not associated with any transport group has been performed, on the basis of the operation data 307, etc. In addition, for example, when a transport body that is not associated with any transport group and a (thrown) first character come into contact with each other, it may be determined that the condition is satisfied.

As a result of the determination, if the condition for creating a new transport group has been satisfied (YES in step S11), in step S12, the processor 81 registers information about a new transport group in the transport group management data 308. Specifically, first, the processor 81 assigns a new group ID and creates new records in the group basic data 309, the constituent member data 310, and the reproduction voice specification data 311. Then, in the constituent member data 310, the first character ID 331 of the thrown first character is added to the constituent member ID 402 (at this time, there is only one first character). In addition, along with this, "transporting" is set as the action state 335 of the first character. Moreover, in the reproduction voice specification data 311, no specific data is set yet at this time, and thus, for example, Null values are set for the items other than the group ID 411. Next, the processor 81 sets the content of the group basic data 309. First, the processor 81 sets the transport body ID 361 of the transport body to be transported, as the transport body ID 392 of the group basic data 309. Next, the processor 81 sets the destination information 393 according to the game situation, etc., at that time, and also sets the current position information 394. In addition, as for the transport speed parameter 395, there is only one constituent member at this time, and thus a transport speed parameter corresponding to this fact is set. Here, the transport speed parameter 395 may be set in consideration of the "weight" of the transport body (the transport speed is relatively slower when the transport body is heavier). That is, the transport speed may be set on the basis of the total number of constituent members and the "weight" of the transport body. In addition, the mid-reproduction flag 396 is initially set to be OFF. Furthermore, the processor 81 calculates the position of the center of gravity of the constituent member (i.e., the position of the center of gravity of the transport group), and sets the virtual speaker position information 397 on the basis of the position of the center of gravity.

On the other hand, as a result of the determination in step S11 above, if the condition for creating a new transport group has not been satisfied (NO in step S11), the process in step S12 above is skipped, and the processor 81 advances the processing to the next step.

Next, in step S13, the processor 81 determines whether or not a condition for disbanding any transport group has been satisfied. For example, whether or not a disbanding instruction operation has been performed is determined on the basis of the operation data 307. In addition, in the exemplary embodiment, if the transport group reaches the destination, it is also determined that the disbanding condition is satisfied. As a result of the determination, if the disbanding condition has been satisfied (YES in step S13), in step S14, the processor 81 performs a process of disbanding the transport group to which a disbanding instruction has been given. Specifically, the processor 81 deletes the information of the transport group to which the disbanding instruction has been given, from the transport group management data 308. On the other hand, if the disbanding condition has not been satisfied (NO in step S13), the process in step S14 is skipped, and the processor 81 advances the processing to the next step.

Next, in step S15, the processor 81 determines whether or not the number of constituent members of any transport group has increased. As described above, by throwing a first character toward an existing transport group, the number of constituent members of the transport group can be increased. Therefore, whether or not the number of constituent members has increased can be determined by determining whether or not such an operation has been performed or a new first character has come into contact with the existing transport group. As a result of the determination, if the number of constituent members has increased (YES in step S15), in step S16, the processor 81 updates the transport group management data 308 so as to reflect this increase therein. Specifically, first, the processor 81 adds the first character ID 331 of the added first character to the constituent member ID 402 in the constituent member data 310 (along with this, the content of the action state 335 of this first character is also updated as appropriate). Furthermore, the processor 81 calculates the number of constituent members after addition on the basis of the constituent member data 310, and resets the transport speed parameter 395 of the group basic data 309 on the basis of this number of constituent members. That is, a transport speed is also set so as to increase as the number of constituent members increases as described above. Moreover, the virtual speaker position information 397 is also reset by calculating the center of gravity of the transport group on the basis of the positional relationship between the constituent members after the increase. Then, the processor 81 ends the transport group management process.

On the other hand, as a result of the determination, if the number of constituent members of any transport group has not increased (NO in step S15), the process in step S16 above is skipped. Then, the processor 81 ends the transport group management process.

In the exemplary embodiment, a description is given on the assumption that the number of constituent members does not decrease during transport. In this regard, in another exemplary embodiment, if the number of constituent members decreases during transport, the transport group management data 308 (transport speed parameter 395, etc.) may be updated such that the decrease in the number of constituent members is reflected therein.

Figure 33:
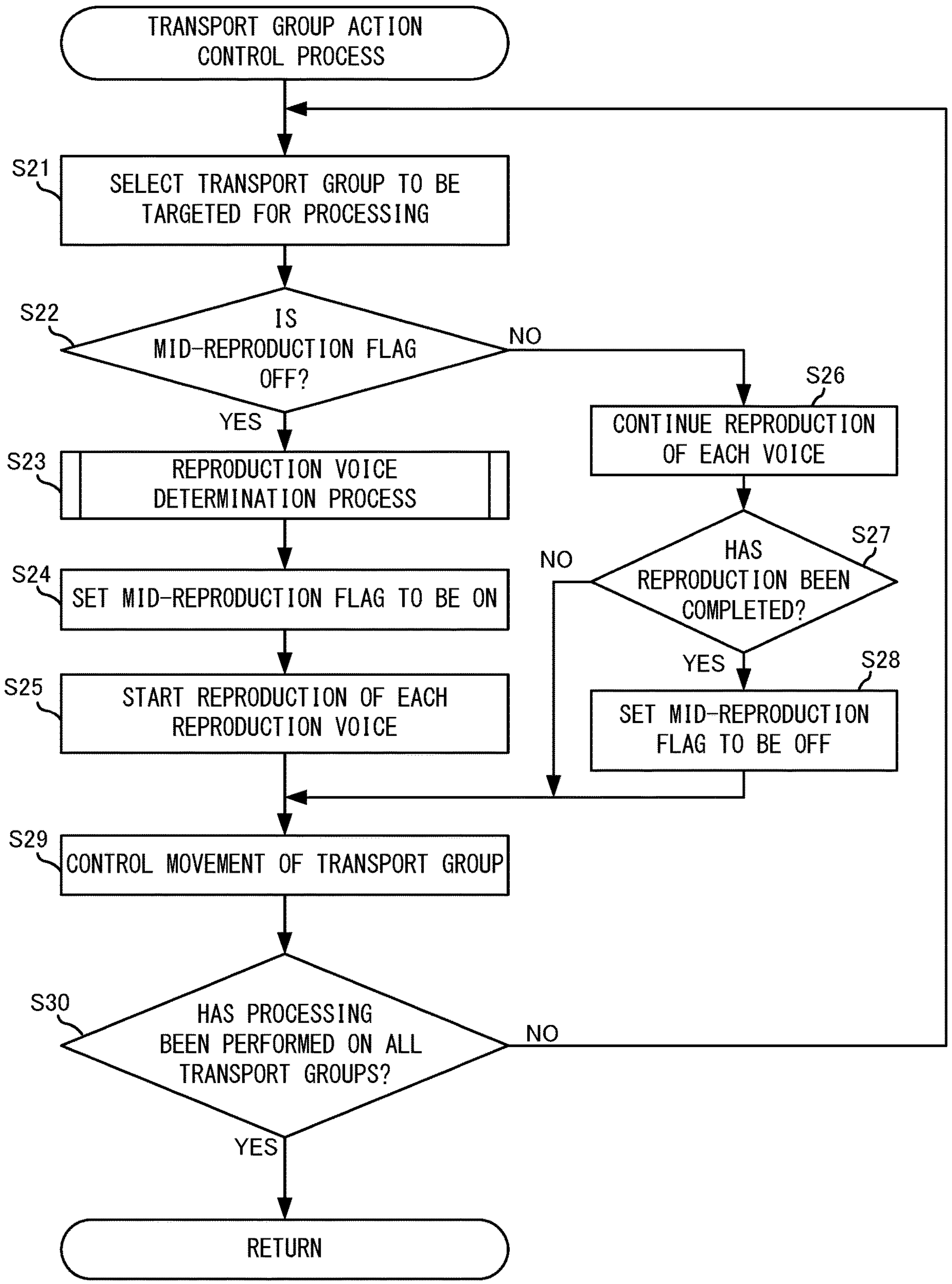
FIG. 33 is a flowchart showing the details of a transport group action control process.

Referring back to FIG. 31, next, in step S4, the processor 81 executes a transport group action control process. In this process, control of the movement of the transport group and control of reproduction of the transport voices are performed. FIG. 33 is a flowchart showing the details of the transport group action control process. In FIG. 33, first, in step S21, the processor 81 selects one transport group to be targeted for processing described below (when a plurality of transport groups have been created). Here, the transport group selected here is referred to as processing target group.

Next, in step S22, the processor 81 determines whether or not the mid-reproduction flag 396 for the processing target group is OFF. That is, whether or not transport voices for the processing target group are currently being reproduced. As a result of the determination, if the mid-reproduction flag 396 is OFF (YES in step S22), the processor 81 executes a reproduction voice determination process in step S23.

Figure 34:
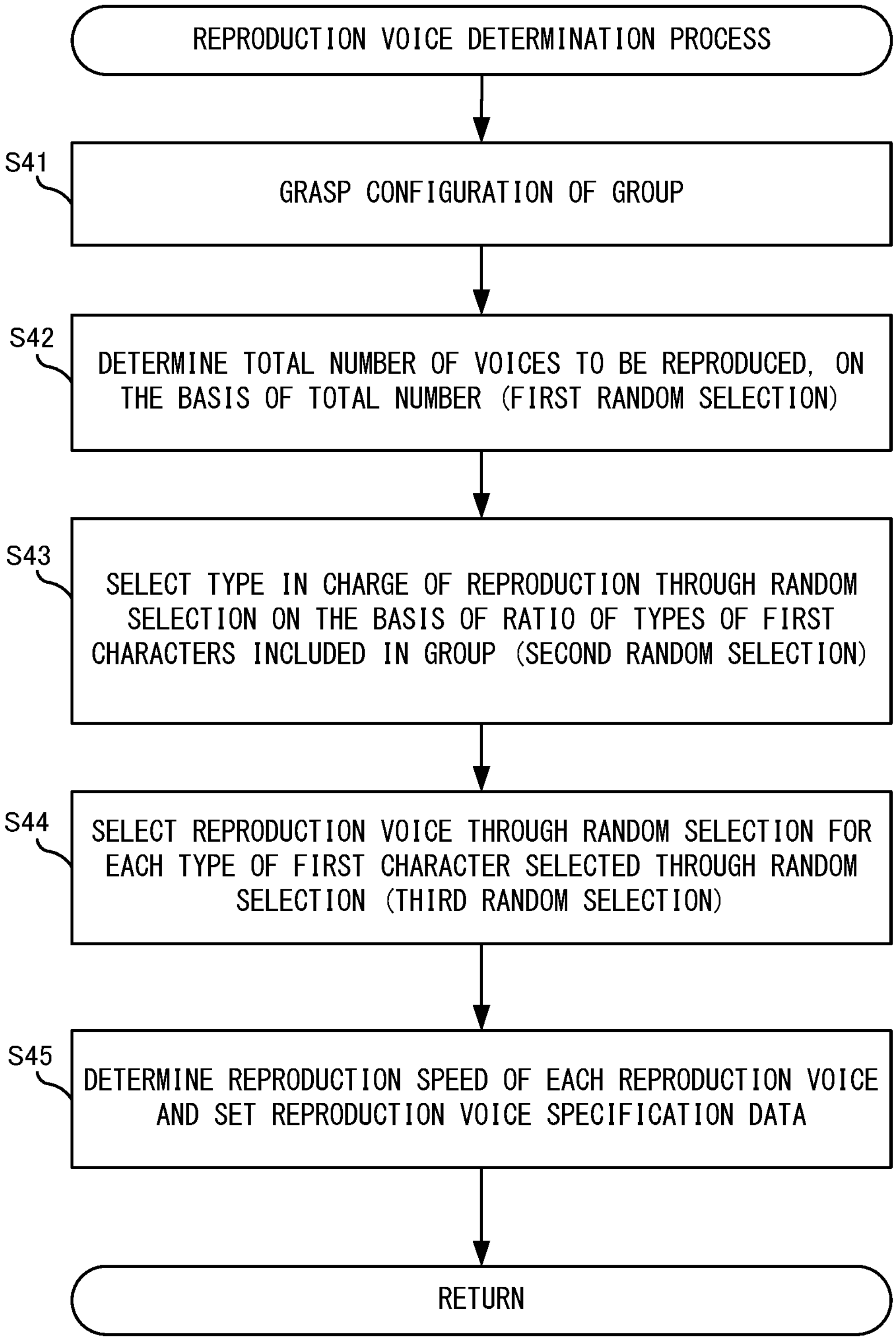
FIG. 34 is a flowchart showing the details of a reproduction voice determination process.

FIG. 34 is a flowchart showing the details of the reproduction voice determination process. In FIG. 34, first, in step S41, the processor 81 refers to the constituent member data 310 and the first character data 303 and calculates the total number of constituent members of the processing target group and the number of first characters for each type.

Next, in step S42, the processor 81 determines the above simultaneous reproduction number on the basis of the total number of constituent members. In the exemplary embodiment, the processor 81 determines the simultaneous reproduction number through random selection as described above. For example, a random selection process may be performed using a random selection table corresponding to the contents shown in FIG. 16. Hereinafter, the random selection process for the simultaneous reproduction number based on the total number of constituent members is referred to as "first random selection process".

Next, in step S43, the processor 81 determines the above type in charge of reproduction on the basis of the ratio of the types of first characters that are the constituent members of the processing target group. In this process, first, the simultaneous reproduction number determined in the first random selection process is set as the number of times of random selection. Then, at each random selection, a selection rate based on the ratio of the types of first characters are set as described above. For example, a predefined random selection table may be used for the selection rate based on the ratio, or a selection rate may be calculated on the basis of the ratio of the types at each random selection. Then, the random selection for the type in charge of reproduction is performed using the set selection rate. Hereinafter, the random selection process for the type in charge of reproduction is referred to as "second random selection process".

Next, in step S44, the processor 81 determines a reproduction voice to be actually reproduced, for each type in charge of reproduction that is determined through random selection in the second random selection process. As described above, in the exemplary embodiment, the four types of transport voices (four sound data) are prepared for each type. Then, a random selection process is performed with a selection rate being 25% for each of the four types of transport voices, and any one of the sound data is determined as a reproduction voice. Hereinafter, the random selection process for the reproduction voice is referred to as "third random selection process".

Next, in step S45, the processor 81 determines a reproduction speed for each reproduction voice determined in the third random selection process. Specifically, the processor 81 determines a reproduction speed on the basis of the transport speed parameter of the group basic data 309 (or the above total number of constituent members). As described above, the reproduction speed is also determined to be higher as the number of constituent members is larger (the transport speed is higher). Then, the processor 81 sets the result of the third random selection process and the determined reproduction speed in the reproduction speed information 413 of the reproduction voice specification data 311. Then, the processor 81 ends the reproduction voice determination process.

Here, supplementary description will be given regarding the reproduction volume of the reproduction voice. In the exemplary embodiment, as for the reproduction volume, the reproduction voice is reproduced at a volume predefined as an initial value. However, in another exemplary embodiment, for example, if there are two or more identical sound data as a result of the determination in the third random selection process, these sound data are not individually reproduced, and may be reproduced as one reproduction voice with the volume thereof being made higher than usual. In addition, in still another exemplary embodiment, the volume of each reproduction voice may be determined randomly.

Referring back to FIG. 33, next, in step S24, the processor 81 sets the mid-reproduction flag 396 to be ON. In subsequent step S25, the processor 81 starts reproduction of each reproduction voice on the basis of the reproduction voice specification data 311. The position of the virtual speaker from which the reproduction voice is outputted is based on the virtual speaker position information 397.

On the other hand, as a result of the determination in step S22 above, if the mid-reproduction flag 396 is ON (NO in step S22), in step S26, the processor 81 continues the reproduction process of each reproduction voice that is currently being reproduced. Next, in step S27, the processor 81 determines whether or not the reproduction of the reproduction voice has been completed. In the exemplary embodiment, it is assumed that the reproduction time of each sound data for the transport voice is all the same. In another exemplary embodiment, the reproduction time of each sound data may be different, and in this case, the completion of reproduction may be determined when reproduction of sound data whose reproduction time is the longest is completed.

As a result of the determination, if the reproduction has not been completed (NO in step S27), the processor 81 advances the processing to step S29 described later. On the other hand, if the reproduction has been completed (YES in step S27), in step S28, the processor 81 sets the mid-reproduction flag 396 to be OFF.

Next, in step S29, the processor 81 controls the movement of the transport group. That is, the processor 81 causes the transport group (the transport body and the first characters) to move toward a predetermined destination at the speed based on the transport speed parameter 395. In addition, along with this, the position of the virtual speaker moves. Moreover, along with this movement, the current position information 394 of the group basic data 309 is also updated as appropriate.

Next, in step S30, the processor 81 determines whether or not the above processing has been performed on all transport groups that currently exist. As a result, if there is still any transport group on which the above processing has not been performed yet (NO in step S30), the processor 81 returns to step S21 above and repeats the processing. If the above processing has been performed on all the transport groups (YES in step S30), the processor 81 ends the transport group action control process.

Referring back to FIG. 31, next, in step S5, the processor 81 controls the action of the first characters that do not belong to any transport group. For example, if there is a first character that is attacking an enemy character, control of continuing the attack action is performed. In addition, the action of NPCs (enemy characters, etc.) other than the first characters is also controlled as appropriate.

[Output of Game Image]

Next, in step S6, the processor 81 generates and outputs a game image. That is, the processor 81 takes an image of the virtual game space in which the above game processing is reflected, with the virtual camera to generate a game image. Then, the processor 81 outputs the game image to the above stationary monitor or the like.

Next, in step S7, the processor 81 determines whether or not an end condition for the game processing has been satisfied. For example, the processor 81 determines whether or not a game end instruction operation has been performed by the user. As a result, if the end condition has not been satisfied (NO in step S7), the processor 81 returns to step S2 above and repeats the processing. If the end condition has been satisfied (YES in step S7), the processor 81 ends the game processing.

This is the end of the detailed description of the game processing according to the exemplary embodiment.

As described above, in the exemplary embodiment, the simultaneous reproduction number of transport voices is determined through random selection on the basis of the total number of constituent members of the transport group. Furthermore, the sound data to be reproduced is determined on the basis of the ratio of the types of the constituent members. Therefore, for example, it is possible to achieve a sound expression in which the voices of red characters and blue characters are heard in a transport voice at a first timing, and the voices of the red characters and white characters are heard at a subsequent second timing. That is, the number of voices to be simultaneously reproduced and the types in charge of reproduction can be made different for each reproduction timing, depending on the total number and the types of constituent members at that time. Accordingly, the contents of the transport voices heard by the user can have randomness in a short span of time. That is, over a short span of time, a variety of types of transport voices can be heard, so that it is possible to achieve a sound expression that gives no unnaturalness and no uncomfortable feeling and that is more like “living creatures”. On the other hand, over a long span of time, the ratio of the types of transport voices heard converges to the ratio of the types of the first characters included in the transport group. That is, if the user hears transport voices for a period of time that is long to some extent, the user can recognize that transport voices corresponding to the ratio of the types are heard. Accordingly, the user can recognize the number and the types of the first characters included in the transport group by simply hearing the transport voices of the transport group, without having to visually look at the transport group.

[Modifications]

In the above embodiment, the example in which four sound data are associated as transport voices with each type of first character has been described. The present disclosure is not limited thereto, and in another exemplary embodiment, one sound data may be associated with each type. In this case, if the type in charge of reproduction is determined by the above second random selection process, a reproduction voice (sound data) is also necessarily determined, so that the above-described third random selection process can be omitted.

In the above embodiment, the case where there is only one virtual speaker from which transport voices are outputted has been exemplified. In another exemplary embodiment, a plurality of virtual speakers may be used. Accordingly, the positions from which transport voices are heard can be scattered, and the transport voices can be heard with a less uncomfortable feeling. For example, the constituent members of the transport group may be divided into a plurality of subgroups, and one virtual speaker may be assigned to each subgroup. However, since the processing load may increase as the number of virtual speakers increases, the number of virtual speakers per transport group may be, for example, about three in consideration of the balance with the processing load.

As for the simultaneous reproduction number, the random selection (first random selection process) based on the total number of constituent members is performed in the above embodiment. However, in another exemplary embodiment, a table that fixedly predefines the relationship between the total number and the simultaneous reproduction number may be prepared, and the simultaneous reproduction number may be determined using this table without performing random selection. In addition, this table may be defined such that, as in the above embodiment, an increase in the simultaneous reproduction number gradually decreases as the number of constituent members increases.

In the flowchart in FIG. 31, the process loop of steps S2 to S7 is repeatedly executed every frame period. In this regard, in another exemplary embodiment, the repetition periods of some processes may be different. For example, the transport group management process in step S3 and the transport group action control process in step S4 may not necessarily be performed synchronously, and the repetition periods thereof may be different. For example, as for the processes related to the flowcharts in FIG. 33 and FIG. 34, the repetition period of the processes in steps S41 and S42 (the grasping of the group configuration and the determination of the simultaneous reproduction number) may be different from that of the processes in steps S43 to S45 (the determination of the reproduction voice) and the processes related to the reproduction of the reproduction voice in step S25 and the subsequent steps. For example, the former processes related to the grasping of the group configuration and the determination of the simultaneous reproduction number may be repeatedly executed every five frame periods, and the later processes related to the determination of the reproduction voice and the reproduction of the reproduction voice may be repeatedly executed every frame period.

In the above embodiment, the control of reproduction of transport voices has been described with a situation of causing (a plurality of) first characters to transport the transport body, as an example. The above control of reproduction of voices is not limited to the above situation, and can be applied to another situation in which collaborative work is performed (by first characters, etc.). For example, in the case of performing collaborative work in which no uncomfortable feeling is given even when "yelling" is reproduced, the above processing may be applied as control of reproduction of the yelling. For example, work of "pushing" or "pulling" a heavy rock or wall may be adopted as an example of the collaborative work. In addition, for example, when a plurality of first characters are attacking the same enemy character, reproduction of yelling during the attack may be controlled through the above-described processing. Also, the above-described reproduction control may be applied to, for example, "clapping" of the audience at a concert, the footsteps of marching party members or horses, etc.

As for the transport voices (sound data), the example in which the voice of a different voice actor is used for each type of first character has been described in the above embodiment. In another exemplary embodiment, transport voices for each type of first character may be created by using the voice of the same voice actor for all the types and using a different word for each type. In addition, transport voices may be created by any method as long as the transport voices are heard in different ways for each type of first character.

In the above embodiment, the case where the series of processes related to the game processing is performed in the single main body apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the main body apparatus 2 may be configured to send operation data indicating a user's operation to a predetermined server, and the server may be configured to execute various kinds of game processing and stream the execution results as video/audio to the main body apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. A non-transitory computer-readable storage medium having stored therein an information processing program executable by an information processing apparatus including at least one processor, the information processing program, when executed, causing the information processing apparatus to perform operations comprising:

(a) managing an object group including at least one object placed in a virtual space, each said object having an object type associated therewith, each said object type having a reproduction sound associated therewith;

(b) acquiring information indicative of a count of each object type of the at least one object included in the object group;

(c) determining a number of reproduction sounds to be reproduced, in accordance with a constituent object number that is a total number of the at least one object included in the object group;

(d) randomly selecting one or more reproduction sounds to be reproduced such that a probability of a given reproduction sound being randomly selected is based on a ratio of the count of each object type of the at least one object included in the object group, wherein a number of random selections equals the number of reproduction sounds to be reproduced;

(e) reproducing the randomly selected one or more reproduction sounds; and (f) continuously and repeatedly performing (b)-(e).

2. The non-transitory computer-readable storage medium according to claim 1, wherein the determining of the number of reproduction sounds is based on a probability corresponding to the constituent object number.

3. The non-transitory computer-readable storage medium according to claim 1, wherein the number of reproduction sounds is determined such that an increase in the number of reproduction sounds gradually decreases as the constituent object number increases.

4. The non-transitory computer-readable storage medium according to claim 1, wherein each said object type is associated with at least two reproduction sounds.

5. The non-transitory computer-readable storage medium according to claim 1, wherein when the same reproduction sound is randomly selected a plurality of times, reproduction thereof is performed in an overlapping manner or at an increased volume.

6. The non-transitory computer-readable storage medium according to claim 1, wherein a reproduction speed is higher as the constituent object number is larger.

7. The non-transitory computer-readable storage medium according to claim 1, wherein the reproduction in (e) is performed from a sound reproduction position that is determined provided that the count is smaller than the constituent object number and equal to or larger than 1.

8. The non-transitory computer-readable storage medium according to claim 1, wherein the virtual space includes a plurality of object groups, and (b)-(e) are continuously and repeatedly performed for each said object group in the virtual space.

9. The non-transitory computer-readable storage medium according to claim 1, wherein the reproduction in (e) is performed at a randomly determined volume.

10. The non-transitory computer-readable storage medium according to claim 1, wherein the at least one object is placed in the virtual space in accordance with an operation input by a user.

11. The non-transitory computer-readable storage medium according to claim 10, wherein:

the at least one object is caused to perform collaborative work on an item placed in the virtual space; and (e) is performed when the collaborative work is being performed.

12. The non-transitory computer-readable storage medium according to claim 1, wherein the object group includes a plurality of objects.

13. An information processing apparatus, comprising:

a memory configured to store a program; and at least one processor configured to execute the program to perform operations comprising:

(a) managing an object group including at least one object placed in a virtual space, each said object having an object type associated therewith, each said object type having a reproduction sound associated therewith;

(b) acquiring information indicative of a count of each object type of the at least one object included in the object group;

(c) determining a number of reproduction sounds to be reproduced, in accordance with a constituent object number that is a total number of the at least one object included in the object group;

(d) randomly selecting one or more reproduction sounds to be reproduced such that a probability of a given reproduction sound being randomly selected is based on a ratio of the count of each object type of the at least one object included in the object group, wherein a number of random selections equals the number of reproduction sounds to be reproduced;

(e) reproducing the randomly selected one or more reproduction sounds; and (f) continuously and repeatedly performing (b)-(e).

14. An information processing system, comprising:

a memory configured and at least one processor configured to cooperate to perform operations comprising:

(a) managing an object group including at least one object placed in a virtual space, each said object having an object type associated therewith, each said object type having a reproduction sound associated therewith;

(b) acquiring information indicative of a count of each object type of the at least one object included in the object group;

(c) determining a number of reproduction sounds to be reproduced, in accordance with a constituent object number that is a total number of the at least one object included in the object group;

(d) randomly selecting one or more reproduction sounds to be reproduced such that a probability of a given reproduction sound being randomly selected is based on a ratio of the count of each object type of the at least one object included in the object group, wherein a number of random selections equals the number of reproduction sounds to be reproduced;

(e) reproducing the randomly selected one or more reproduction sounds; and (f) continuously and repeatedly performing (b)-(e).

15. An information processing method executed by a computer of an information processing apparatus, the method comprising:

(a) managing an object group including at least one object placed in a virtual space, each said object having an object type associated therewith, each said object type having a reproduction sound associated therewith;

(b) acquiring information indicative of a count of each object type of the at least one object included in the object group;

(c) determining a number of reproduction sounds to be reproduced, in accordance with a constituent object number that is a total number of the at least one object included in the object group;

(d) randomly selecting which one or more reproduction sounds to be reproduced such that a probability of a given reproduction sound being randomly selected is based on a ratio of the count of each object type of the at least one object included in the object group, wherein a number of random selections equals the number of reproduction sounds to be reproduced;

(e) reproducing the randomly selected one or more reproduction sounds; and (f) continuously and repeatedly performing (b)-(e).

16. The information processing method according to claim 15, wherein the number of reproduction sounds is determined such that an increase in the number of reproduction sounds gradually decreases as the constituent object number increases.

17. The information processing method according to claim 15, wherein when the same reproduction sound is randomly selected a plurality of times, reproduction thereof is performed in an overlapping manner or at an increased volume.

18. The information processing method according to claim 15, wherein a reproduction speed is higher as the constituent object number is larger.

19. The information processing method according to claim 15, wherein the virtual space includes a plurality of object groups, and (b)-(e) are continuously and repeatedly performed for each said object group in the virtual space.

20. The information processing method according to claim 15, wherein the object group includes a plurality of objects.

* * * * *